US010100901B1

(12) United States Patent
Nguyen

(10) Patent No.: US 10,100,901 B1
(45) Date of Patent: Oct. 16, 2018

(54) SWIVEL SHACKLE SETS

(71) Applicant: Nhon Hoa Nguyen, Bankstown (AU)

(72) Inventor: Nhon Hoa Nguyen, Bankstown (AU)

( * ) Notice: Subject to any disclaimer, the term of this patent is extended or adjusted under 35 U.S.C. 154(b) by 0 days.

(21) Appl. No.: 15/810,151

(22) Filed: Nov. 13, 2017

(51) Int. Cl.
*F16G 15/08* (2006.01)

(52) U.S. Cl.
CPC .................... *F16G 15/08* (2013.01)

(58) Field of Classification Search
CPC ........... F16G 15/04; F16G 15/08; E05B 75/00
USPC ...................................................... 70/16–18
See application file for complete search history.

(56) References Cited

U.S. PATENT DOCUMENTS

| | | | | |
|---|---|---|---|---|
| 3,297,293 A * | 1/1967 | Andrews | ................. | B66C 1/666 24/115 K |
| 4,089,195 A * | 5/1978 | Lai | ......................... | E05B 75/00 361/232 |
| 4,274,252 A * | 6/1981 | Cavender | ................. | F16G 15/08 59/86 |
| 4,482,264 A * | 11/1984 | Kodera | .................. | A01K 91/03 403/165 |
| 4,530,534 A * | 7/1985 | Fredriksson | ............ | F16G 15/04 294/74 |
| 4,592,686 A * | 6/1986 | Andrews | ................... | B66C 1/66 248/499 |
| 4,641,986 A * | 2/1987 | Tsui | .......................... | B66C 1/66 24/115 K |
| 5,205,142 A * | 4/1993 | Kruger | ..................... | E05B 75/00 16/365 |
| 5,505,064 A * | 4/1996 | Wang | ...................... | E05B 67/06 70/39 |
| 5,598,723 A * | 2/1997 | Ecker | ...................... | E05B 75/00 16/223 |
| 5,683,131 A * | 11/1997 | Lucas | ....................... | B66C 1/18 294/74 |
| 5,975,786 A * | 11/1999 | Chang | ....................... | B66C 1/66 116/212 |
| 8,230,706 B1 * | 7/2012 | Amo | ....................... | E05B 75/00 70/15 |
| 8,596,701 B2 * | 12/2013 | Alba | ........................ | B66C 1/66 294/215 |
| 9,038,360 B1 * | 5/2015 | Moreau | ................... | F16G 15/06 59/86 |
| 9,046,123 B2 * | 6/2015 | Rinklake | ................. | F16B 45/00 |
| 9,169,900 B1 * | 10/2015 | Moreau | ................... | F16G 15/06 70/16 |
| 2002/0189302 A1 * | 12/2002 | Anderson | ............... | E05B 75/00 70/16 |
| 2003/0024458 A1 * | 2/2003 | Murphy | .................. | B63B 21/60 114/249 |
| 2004/0261471 A1 * | 12/2004 | Amo | ....................... | E05B 75/00 70/16 |
| 2012/0318028 A1 * | 12/2012 | Hahn | .................... | E05B 67/063 70/41 |
| 2015/0143674 A1 * | 5/2015 | Maurice | ................. | F16B 45/04 24/598.7 |

\* cited by examiner

*Primary Examiner* — Daniel J Wiley
(74) *Attorney, Agent, or Firm* — Tue Nguyen

(57) ABSTRACT

Swivel shackle can be configured to accept different sizes and designs of the shackles. The swivel shackle configurations can include a swivel assembly, which can include one or more coupling interfaces to allow coupling with shackles having different arc sizes and/or different designs.

20 Claims, 27 Drawing Sheets

Forming a swivel shackle with a replaceable shackle
300

FIG. 3A

Forming a swivel assembly, wherein a first side of the swivel assembly is configured to accept first shackles with different arc sizes, wherein a second side of the swivel assembly is configured to accept second shackles with different arc sizes or is permanently coupled with a third shackle
320

FIG. 3B

Forming a swivel shackle assembly, wherein the swivel shackle assembly comprises multiple shackles with different arc sizes, wherein the swivel shackle assembly further comprises a swivel assembly configured to accept the multiple shackles
340

FIG. 3C

Selecting a shackle with a desired arc size
360

Coupling the shackle with a swivel assembly
370

FIG. 3D

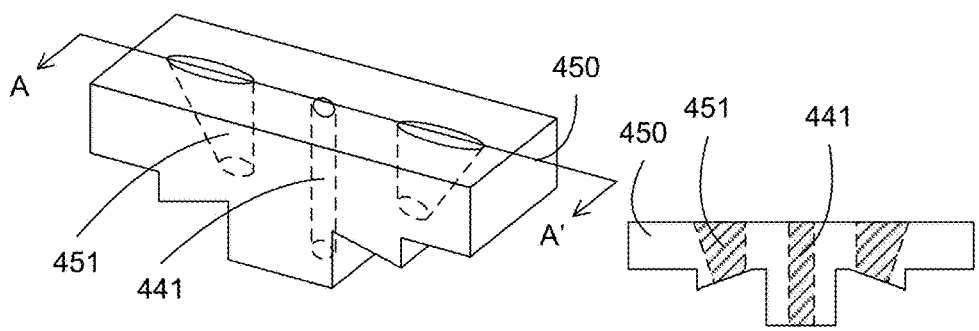
*FIG. 4A*
*FIG. 4B*
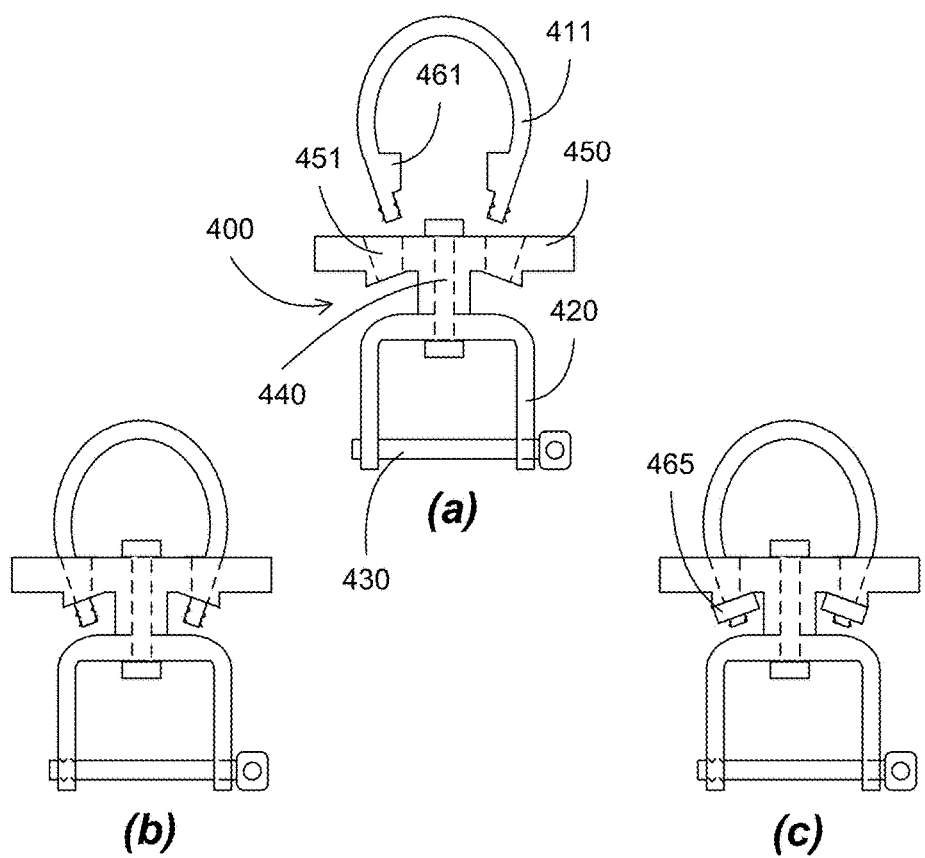
*FIG. 4C*

Forming a swivel assembly, wherein the swivel assembly comprises a first portion and a second portion, wherein the first portion comprises a crosspiece rotatable relative to the second portion, wherein the crosspiece comprises through openings for accepting shackles having different arc sizes, wherein the through openings comprise a larger top portion and a smaller bottom portion to accommodate slanted end portions of the shackles
500

Forming multiple shackles having different arc sizes, wherein the multiple shackles each comprises same slanted end portions configured to fill the through openings in the swivel assembly
510

*FIG. 5A*

Selecting a shackle with a desired arc size
530

Inserting two ends of the shackle into a swivel assembly, wherein the ends of the shackles fit into openings of the swivel assembly
540

Securing the shackle with the swivel assembly
550

*FIG. 5B*

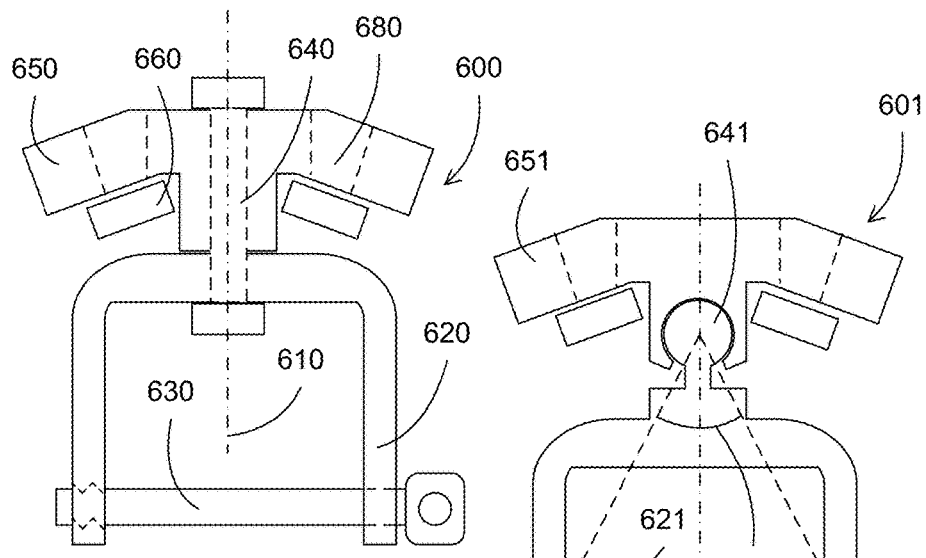
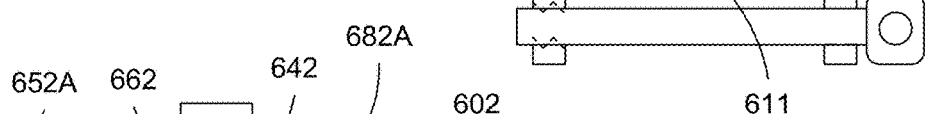
*FIG. 6A*
*FIG. 6B*
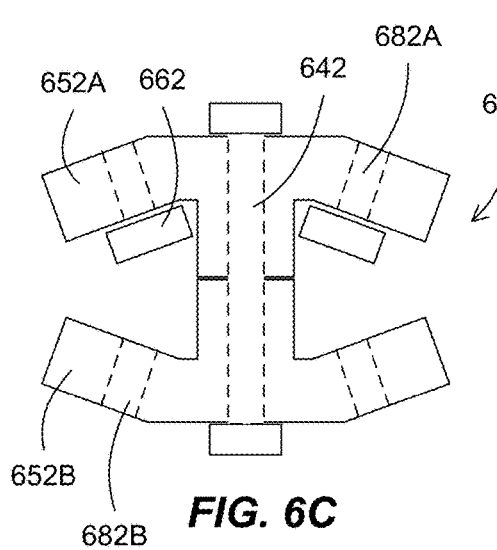
*FIG. 6C*
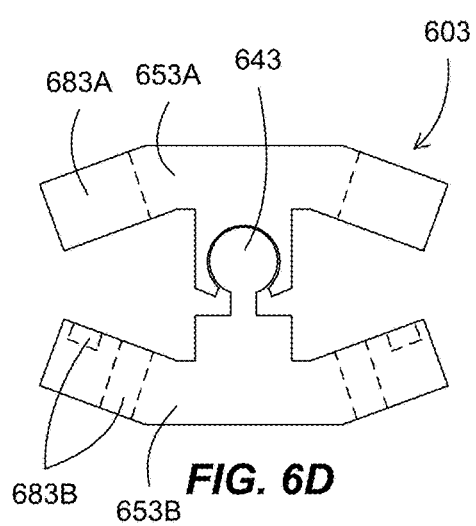
*FIG. 6D*

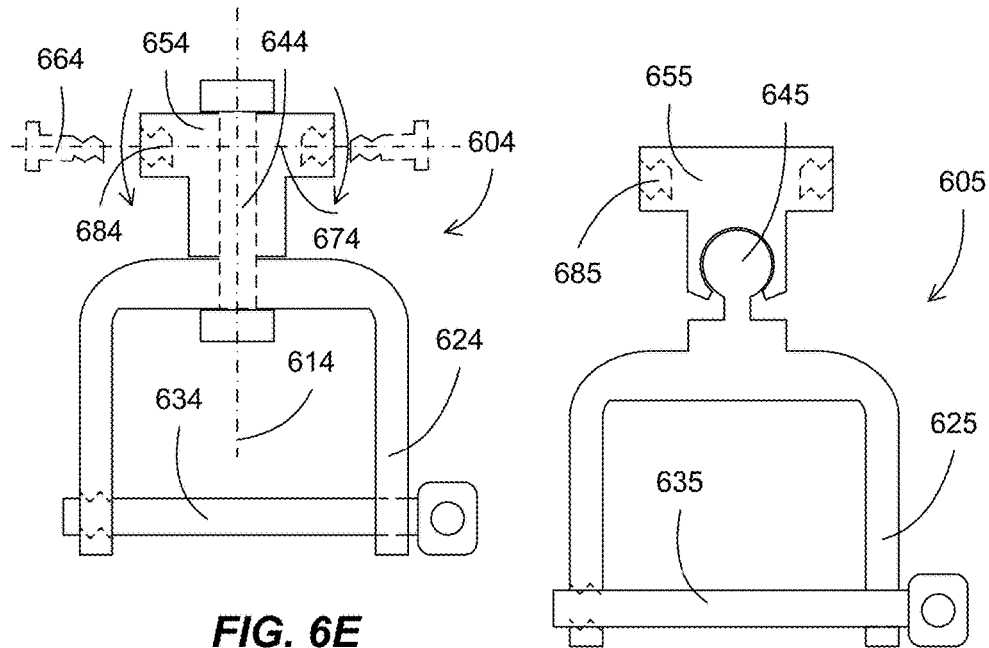
*FIG. 6E*
*FIG. 6F*
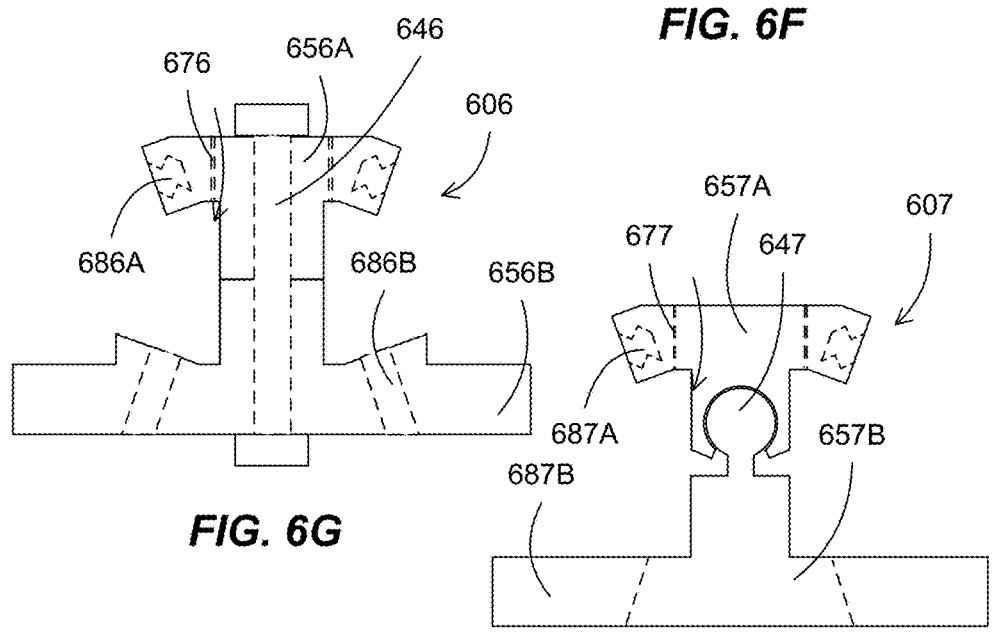
*FIG. 6G*
*FIG. 6H*

Forming a swivel assembly, wherein the swivel assembly comprises a first portion and a second portion, wherein the first portion is coupled to the second portion through an axle, wherein the first portion comprises coupling interfaces for accepting shackles having different arc sizes, wherein the first portion comprises bolts for securing the shackles
700

FIG. 7A

Forming a swivel assembly, wherein the swivel assembly comprises a first portion and a second portion, wherein the first portion is coupled to the second portion through a ball swivel fitting, wherein the first portion comprises coupling interfaces for accepting shackles having different arc sizes
720

FIG. 7B

Forming a swivel assembly, wherein the swivel assembly comprises a first portion and a second portion, wherein the first portion is coupled to the second portion through a swivel fitting, wherein the first portion comprises coupling interfaces for accepting first shackles having different arc sizes, wherein the second portion is permanently coupled to a second shackle
740

FIG. 7C

Forming a swivel assembly, wherein the swivel assembly comprises a first portion and a second portion coupled through a swivel fitting, wherein the first and second portions comprise coupling interfaces for accepting shackles having different arc sizes
760

FIG. 7D

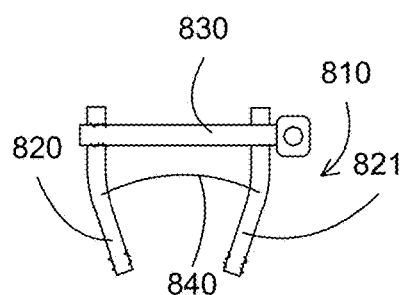
FIG. 8A
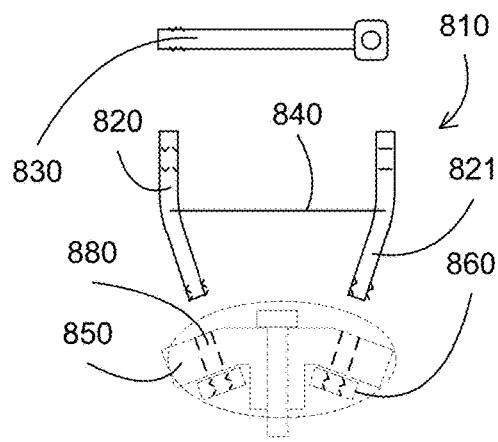
(a)
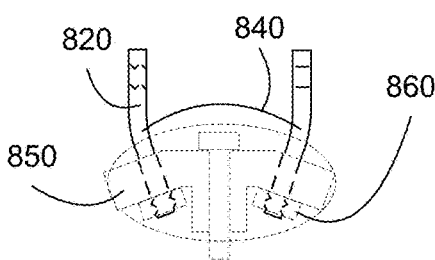
(b)
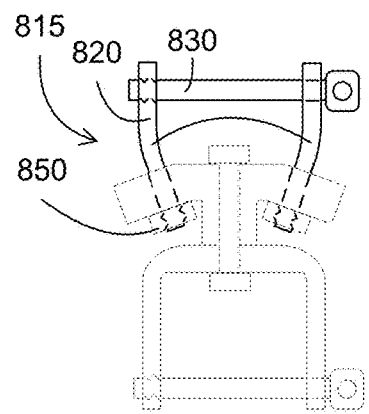
(c)
FIG. 8B
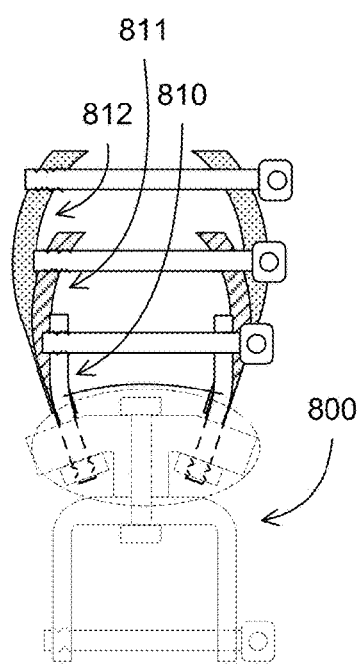
FIG. 8C

Forming a swivel assembly, wherein the swivel assembly comprises a first portion rotatably coupled to a second portion, wherein the first portion comprises straight through openings forming an angle with the rotating axis, wherein the openings are configured for accepting shackles having different arc sizes
900

Forming multiple shackles, wherein the multiple shackles each comprises two separate arms, wherein the arms comprise straight end portions and arc portions, wherein the straight end portions are configured to be coupled to the straight through openings, wherein the arc portions form different arc sizes in different shackles of the multiple shackles
910

*FIG. 9A*

Selecting a shackle with a desired arc size, wherein the shackle comprises two separate arms, wherein each arm comprises a straight end portion and an arc portion
930

Inserting the straight end portions into a swivel assembly, wherein the ends of the shackles fit into openings of the swivel assembly
940

Securing the arms with the swivel assembly
950

*FIG. 9B*

Forming a swivel assembly, wherein the swivel assembly comprises a first portion rotatably coupled to a second portion, wherein the first portion comprises through openings, wherein the openings are configured for accepting shackles having different arc sizes inserting from a side of the first portion nearest to the second portion
1100

↓

Forming multiple shackles having different arc sizes, wherein the multiple shackles each comprises two separate arms, wherein the arms comprise hooks for securing to the swivel assembly, wherein the arms are configured to be inserted to the through openings from a side facing the second portion
1110

*FIG. 11A*

Selecting a shackle with a desired arc size, wherein the shackle comprises two separate arms, wherein the arms each comprises a hook for coupling with a swivel assembly from a side facing another shackle
1130

↓

Inserting the arms into the swivel assembly, wherein the hooks prevent the arms from leaving the swivel assembly
1140

↓

Optionally securing the shackle with the swivel assembly
1150

*FIG. 11B*

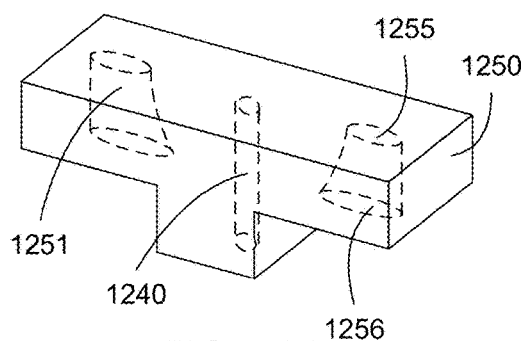
FIG. 12A
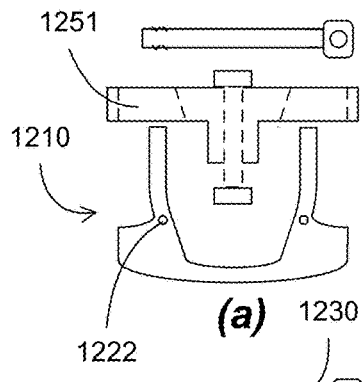
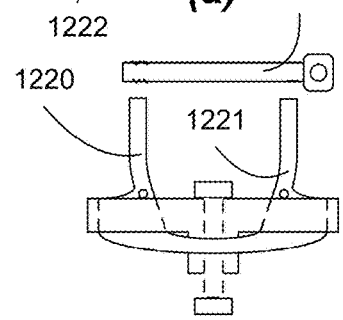
FIG. 12B
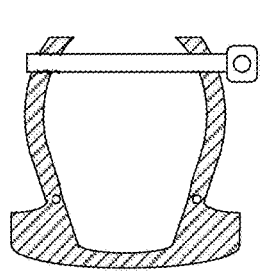
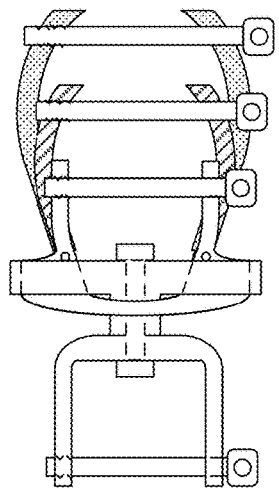
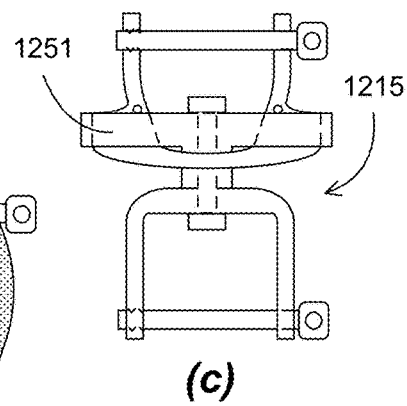
FIG. 12C

Forming a swivel assembly, wherein the swivel assembly comprises a first portion rotatably coupled to a second portion, wherein the first portion comprises through openings, wherein the openings are configured for accepting shackles having different arc sizes inserting from a side of the first portion nearest to the second portion
1300

Forming multiple shackles having different arc sizes, wherein the multiple shackles each comprises same end portions, wherein the end portions are configured to fit the through openings in the swivel assembly, wherein the multiple shackles are configured to be inserted to the through openings from a side facing the second portion
1310

*FIG. 13A*

Selecting a shackle with a desired arc size, wherein the shackle comprises an end portion configured to fit to a swivel assembly from a side facing another shackle
1330

Inserting the end portions into the swivel assembly, wherein the ends of the shackles fit into openings of the swivel assembly
1340

Optionally securing the shackle with the swivel assembly
1350

*FIG. 13B*

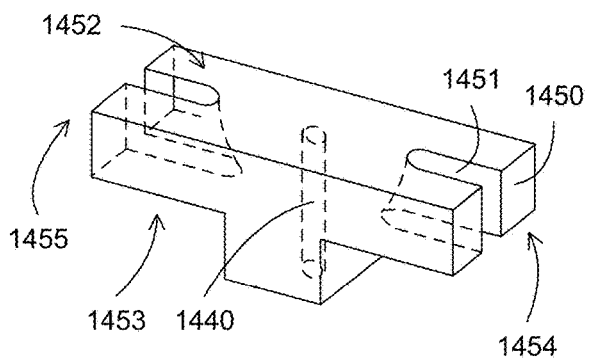
FIG. 14A
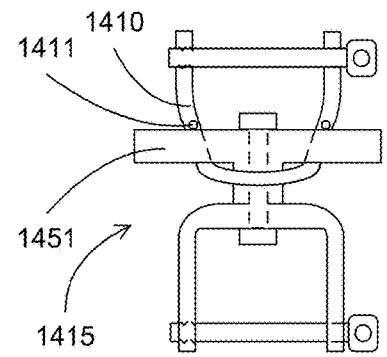
FIG. 14B
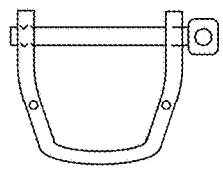
(a)
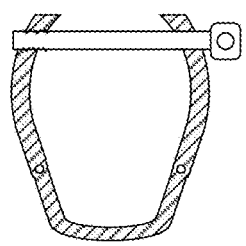
(b)
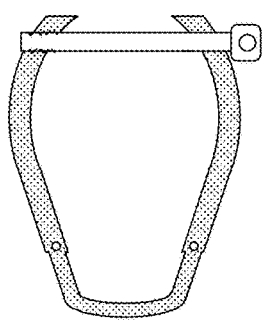
FIG. 14C (c)
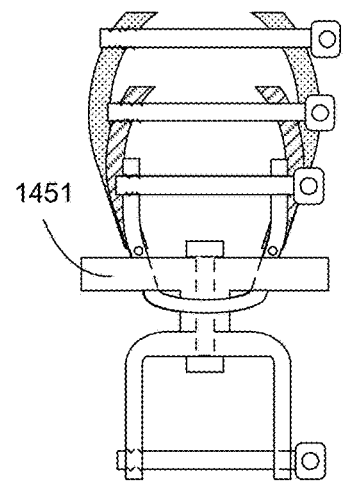
FIG. 14D

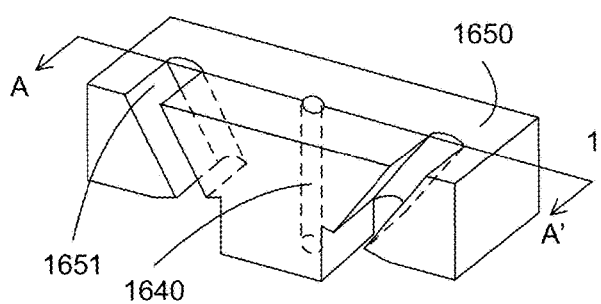
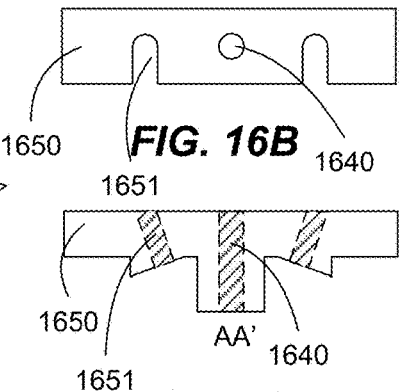
FIG. 16A
FIG. 16B
FIG. 16C
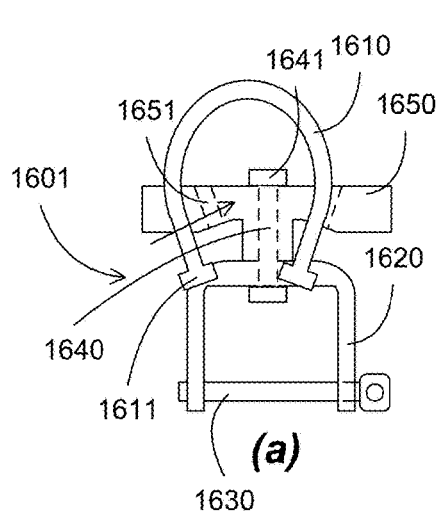
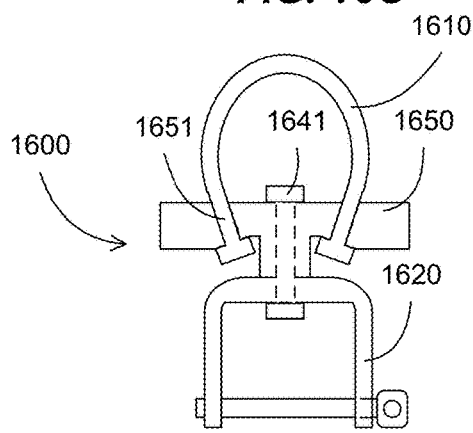
FIG. 16D
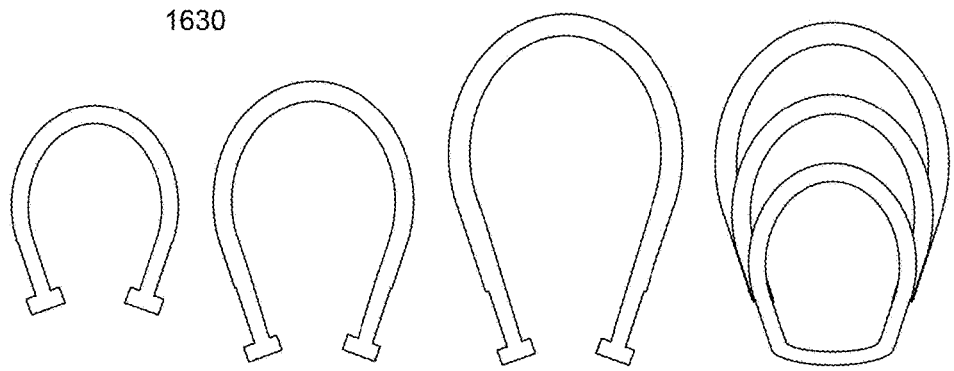
FIG. 16E
FIG. 16F Forming a swivel assembly, wherein the swivel assembly comprises a first portion rotatably coupled to a second portion, wherein the first portion comprises partial cuts forming an angle with the rotating axis, wherein the partial cuts partially cut the first portion from a side, wherein the partial cuts are configured for accepting shackles having different arc sizes
1800

Forming multiple shackles having different arc sizes, wherein the multiple shackles each comprises same slanted end portions configured to fit the partial cuts in the swivel assembly
1810

*FIG. 18A*

Selecting a shackle with a desired arc size
1830

Inserting the shackle into a swivel assembly, wherein the shackles fit into cuts of the swivel assembly from a side of the swivel assembly
1840

Optionally securing the shackle with the swivel assembly
1850

*FIG. 18B*

```
┌─────────────────────────────────────────────┐
│ Forming a swivel assembly, wherein the swivel assembly │
│ comprises a first portion rotatably coupled to a second │
│ portion, wherein the first portion comprises side coupling for │
│ accepting shackles having different arc sizes │
│                    2000                     │
└─────────────────────────────────────────────┘
                      ↓
┌─────────────────────────────────────────────┐
│ Forming multiple shackles having different arc sizes, │
│ wherein the multiple shackles each comprises same end │
│ portions configured to couple with the side coupling in the │
│ swivel assembly │
│                    2010                     │
└─────────────────────────────────────────────┘
```

FIG. 20A

```
┌─────────────────────────────────────────────┐
│ Selecting a shackle with a desired arc size │
│                    2030                     │
└─────────────────────────────────────────────┘
                      ↓
┌─────────────────────────────────────────────┐
│ Coupling two ends of the shackle into a swivel assembly, │
│ wherein the coupling comprises secured or rotatable │
│ connections of the shackle with the swivel assembly │
│                    2040                     │
└─────────────────────────────────────────────┘
```

FIG. 20B

Forming a swivel assembly, wherein the swivel assembly comprises a first portion rotatably coupled to a second portion, wherein the first portion comprises through openings for accepting shackles having different arc sizes
2400

Forming multiple shackles having different arc sizes, wherein the multiple shackles each comprises same straight end portions configured to fit the through openings in the swivel assembly
2410

*FIG. 24A*

Selecting a shackle with a desired arc size, wherein the shackle comprises a curve arc coupled to two straight end portions
2430

Inserting the two end portions of the shackle into a swivel assembly
2440

Securing the shackle with the swivel assembly
2450

*FIG. 24B*

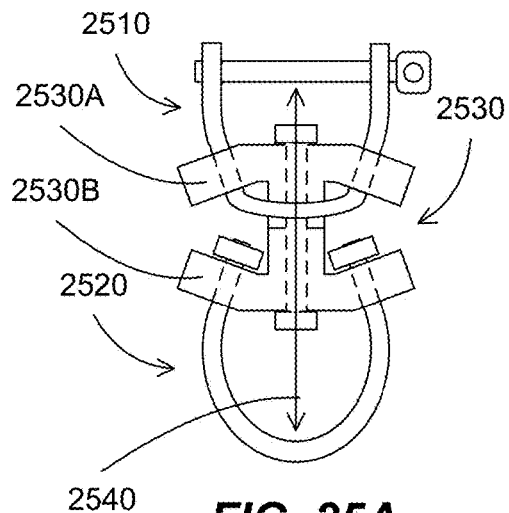
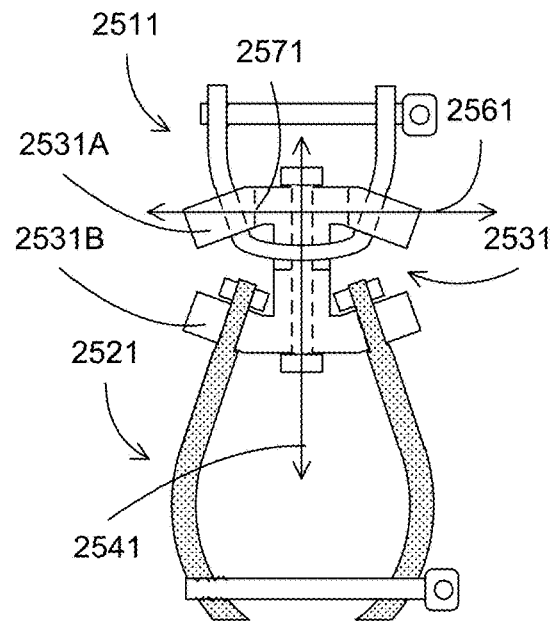
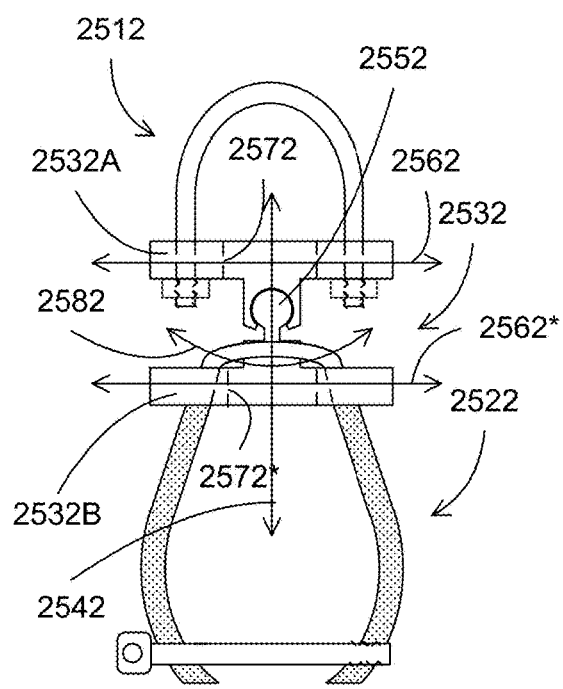
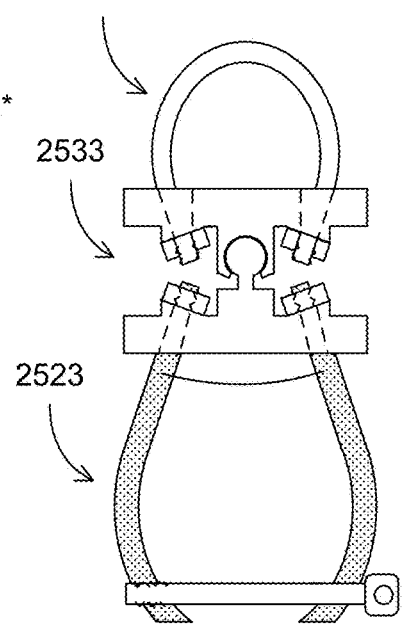
FIG. 25A
FIG. 25B
FIG. 25C
FIG. 25D

SWIVEL SHACKLE SETS

Swivel shackle assemblies have been used with cables and a hoist to lift and move heavy objects. These swivel shackle assemblies typically include two shackle members which are rotatable with respect to each other about a swivel axis. This enables the shackle to accommodate rotational movements which can be necessary for the geometry of the hoist arrangement.

FIGS. 1A-1B illustrate a prior art swivel shackle configuration according to some embodiments. FIG. 1A shows a swivel shackle 100 that can include a first shackle member 110, which includes an "O" shaped shackle member, e.g., an eye shackle. The swivel shackle 100 can include a second shackle member 120, which includes a "U" shaped shackle member, e.g., a jaw shackle. The jaw shackle 120 can have two separate end sections at the end of the U shape. A pin configuration 130 can be used to connect the two sections of the U shaped jaw shackle. The pin configuration can include a screw pin, e.g., the pin can have thread at an end to screw into mated thread of the shackle. The pin configuration can include a bolt pin, e.g., a nut can be mated to the bolt pin to secure the bolt pin to the end of the shackle. The two shackle members 110 and 120 can be coupled through a rod swivel 140, so that the shackle members are rotatable around the swivel rod 140.

The swivel shackle configuration can have different sizes, e.g., different arc size for the shackle members, such as the arc sizes of the U shape or the O shape of the shackle members. FIGS. 1B(a)-(c) show swivel shackles 101, 102, and 103 having different sizes. There can also be other designs and configurations of swivel shackles.

Thus, to meet the demand for the various types and sizes of swivel shackles, it has been necessary to manufacture and stock the swivel shackles in each of the various sizes and designs. This can result in considerable expense in manufacture and inventory related to swivel shackles.

SUMMARY OF THE DESCRIPTION

In some embodiments, the present invention discloses swivel shackle configurations that can be configured for different sizes and designs of the shackles. The swivel shackle configurations can include a swivel assembly, which can include one or more coupling interfaces to allow coupling with shackles having different arc sizes and/or different designs.

In some embodiments, the present invention discloses a swivel assembly that can be used to couple to different shackles. The swivel assembly and the shackles can have mated coupling interfaces, so that a desired shackle can be secured to the swivel assembly to form a swivel shackle with a selected size and design.

In some embodiments, the present invention discloses a swivel shackle set that can include a swivel assembly and multiple shackles having different sizes and designs. The swivel assembly can be mated with any of the shackles, to form a swivel shackle with a selected size and design.

BRIEF DESCRIPTION OF THE DRAWINGS

FIGS. 3A-3D illustrate flow charts for forming a swivel shackle according to some embodiments.
FIGS. 4A-4C illustrate a replaceable swivel shackle according to some embodiments.
FIGS. 5A-5B illustrate flow charts for forming a swivel shackle according to some embodiments.
FIGS. 6A-6H illustrate configurations for swivel assemblies according to some embodiments.
FIGS. 7A-7D illustrate flow charts for forming swivel assemblies according to some embodiments.
FIGS. 8A-8C illustrate a configuration for a swivel shackle according to some embodiments.
FIGS. 9A-9B illustrate flow charts for forming replaceable shackles according to some embodiments.
FIGS. 11A-11B illustrate flow charts for forming replaceable shackles according to some embodiments.
FIGS. 12A-12C illustrate a configuration for a swivel shackle according to some embodiments.
FIGS. 13A-13B illustrate flow charts for forming replaceable shackles according to some embodiments.
FIGS. 14A-14D illustrate a configuration for a swivel shackle according to some embodiments.
FIGS. 16A-16F illustrate a configuration for a swivel shackle according to some embodiments.
FIGS. 18A-18B illustrate flow charts for forming replaceable shackles according to some embodiments.
FIGS. 20A-20B illustrate flow charts for forming replaceable shackles according to some embodiments.
FIGS. 24A-24B illustrate flow charts for forming swivel shackles according to some embodiments.
FIGS. 25A-25D illustrate swivel shackle configurations with replacement shackles at both sides according to some embodiments.

DETAILED DESCRIPTION OF THE EMBODIMENTS

Figure 1A:
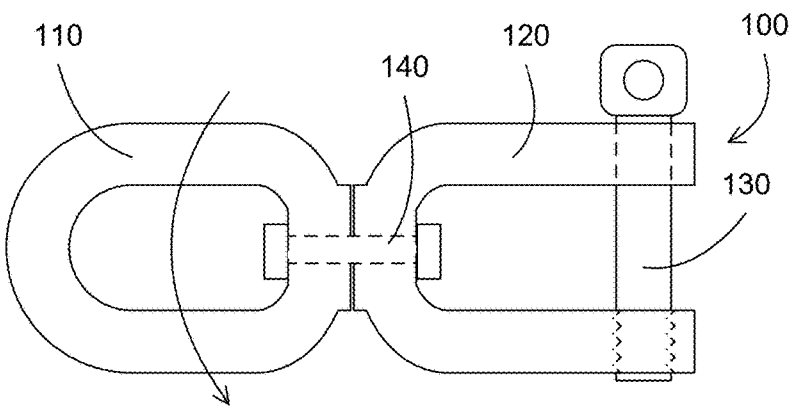
FIGS. 1A-1B illustrate a prior art swivel shackle configuration according to some embodiments.
Figure 1B:
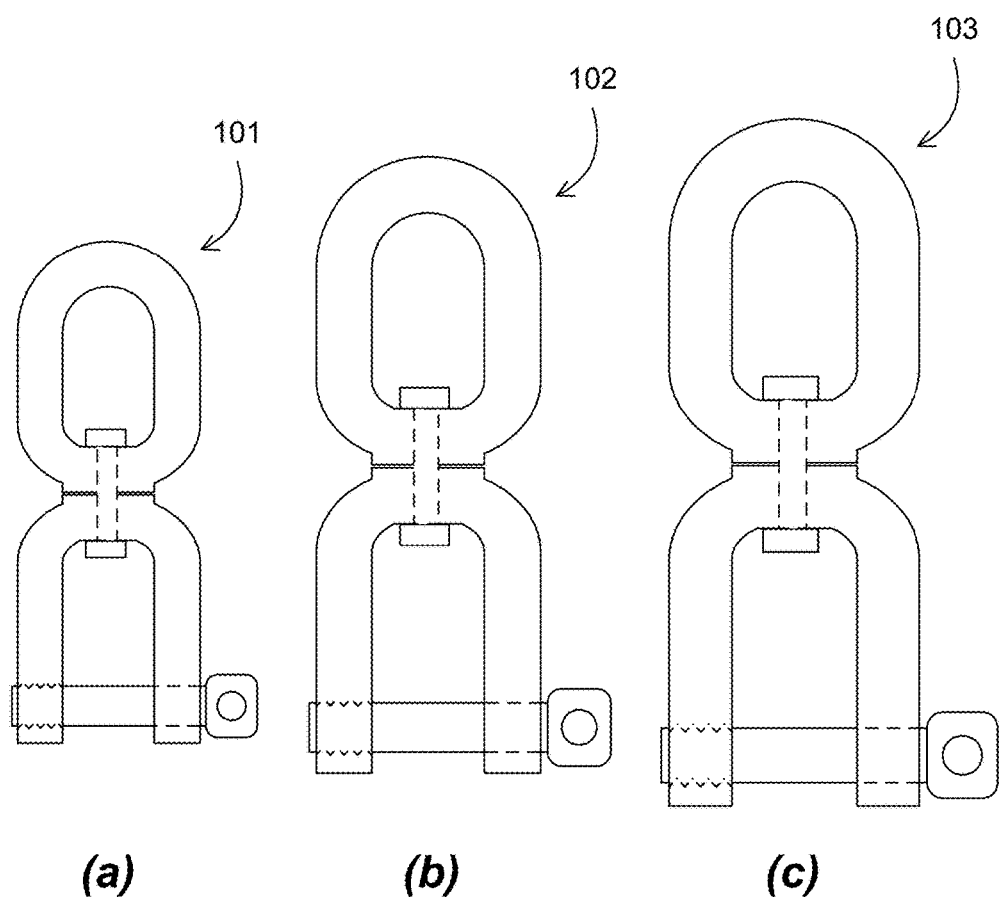
Figure 2A:
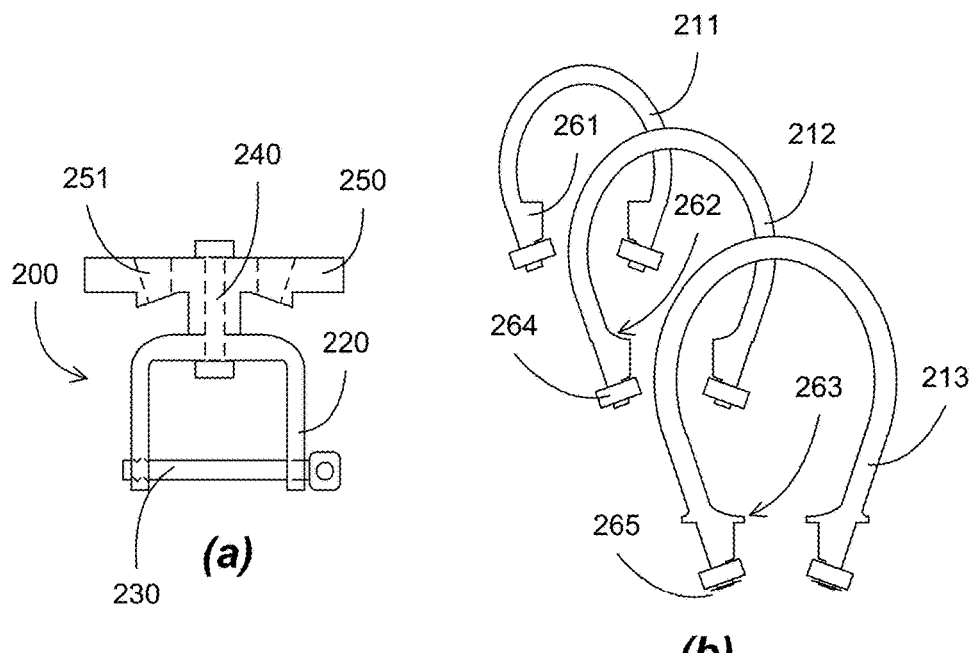
FIGS. 2A-2B illustrate a swivel shackle configuration according to some embodiments.
Figure 2B:
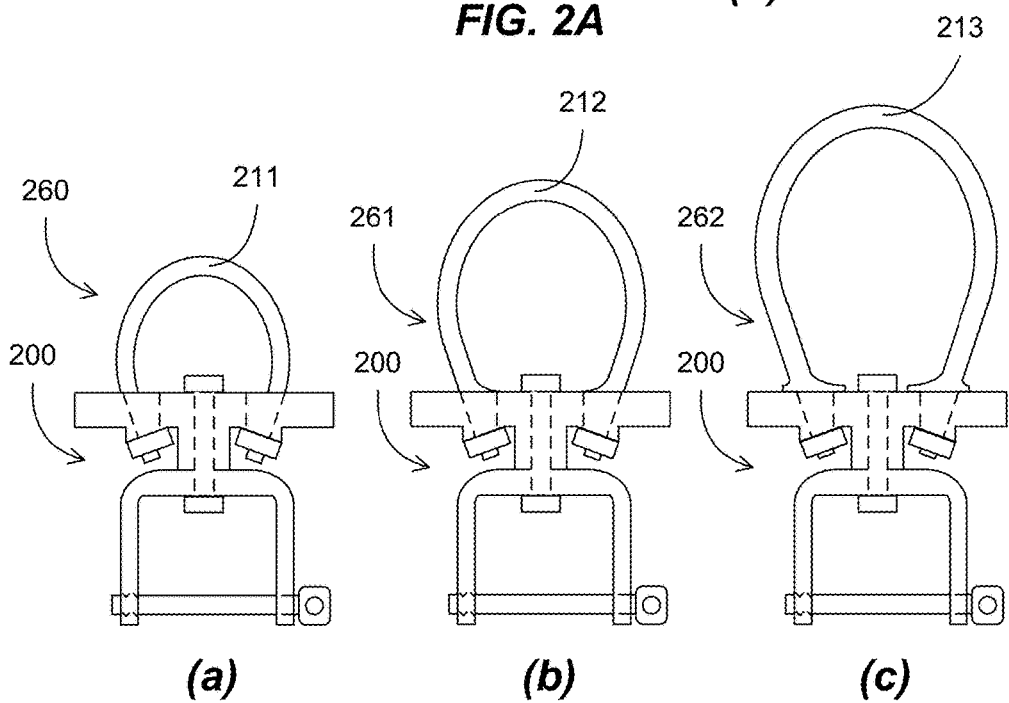

FIGS. 2A-2B illustrate a swivel shackle configuration according to some embodiments. FIG. 2A(a) shows a swivel assembly 200. FIG. 2A(b) shows multiple shackles 211, 212, and 213 having different arc sizes, e.g., smaller and larger arcs of the U shaped shackles. Any of the shackles 212, 212, and 213 can be coupled to the swivel assembly 200. The term "U shape" can include any design that resembles a letter U, e.g., having one or more arcs or segments with an opening, such as a cutoff O shape, e.g., an O shape with a portion of the O cutoff, or an open loop shape, a U shape, or a V shape. Other configurations can be used, such as two separate arcs coupled by a pin, or an O shape shackles. The term "O shape" can include any design that resembles a letter O, e.g., having one or more arcs or segments closed together, including an oval shape, and a two half circles connected by straight segments.

The swivel assembly 200 can include a first portion 250, which is rotatably coupled to a second portion 220, for example, through a swivel shaft 240. The first portion 250 can include coupling interface 251, which can be configured to be coupled to a mated coupling interface of the multiple shackles. Thus a shackle can be selected, for example, based on a design or a size consideration, and then the selected shackle can be coupled to the coupling interface 251 of the first portion 250 of the swivel assembly 200. The second portion can include a shackle, e.g., a shackle can be permanently coupled to the swivel assembly 200. For example, a shackle 220 can be a jaw shackle, e.g., a U shaped load bearing connector resembling a bow or a jaw, and a shackle pin 230 for closing the jaw. The jaw can include shackle ears at the end portions to support the shackle pin. The shackle pin can be a screw pin or a bolt-type pin.

Alternatively, the shackle 220 can be an eye shackle similar to the shackle 211, 212, or 213, e.g., a close U shaped or an O shaped shackle body without a shackle pin. The eye shackle 211 can have a U shaped body with the opening of the U secured to the swivel assembly, to form a close loop or an O shaped shackle. The jaw shackle 220 can have a U shaped body with the bottom of the U secured to the swivel assembly, to form an open loop, which can be close with the shackle pin.

Also, the second portion can include a second coupling interface for coupling to different second shackles.

The swivel assembly 200 can be mated with any shackles having a mated coupling interface with the coupling interface 251. For example, shackles 211, 212, and 213 can have different arc sizes, e.g., shackle 213 is larger than shackle 212 (e.g., having a larger diameter or a larger inner area such as the area covered by the shackle body), which in turn, is larger than shackle 211. The shackles 211, 212, and 213 all have a mated coupling interface 261, e.g., a coupling interface that can be mated to the coupling interface 251 of the swivel assembly 200.

There can be variations on the coupling interface 261, such as having a chamfer corner 262, or having a flange 263. In addition, secure element, such as nuts 264 and cotter pins 265 can be used to secure the shackle to the swivel assembly.

As shown, the shackles 211, 212, and 213 are eye shackles, while the shackle 220 can be a jaw shackle. Other configurations can be used, such as eye-eye shackles, jaw-eye shackles, or jaw-jaw shackles.

FIGS. 2B(a), 2B(b), and 2B(c) show different swivel shackles 260, 261, and 263 in which a same swivel assembly 200 is coupled to different shackles 211, 212, and 213. The shackles can have a same coupling interface (with variations for ease of manufacturing, better reliability, and/or secured assembling), with different dimensions, e.g., different arc sizes of the U shaped configurations.

FIGS. 3A-3D illustrate flow charts for forming a swivel shackle according to some embodiments. In FIG. 3A, operation 300 forms a swivel shackle with one or more replaceable shackles. For example, the swivel shackle can include one replaceable shackle coupled to the swivel assembly, with the other shackle permanently coupled to the swivel assembly. The swivel shackle can include two replaceable shackles, coupled to both sides of the swivel assembly.

In FIG. 3B, operation 320 forms a swivel assembly. A first side of the swivel assembly can be configured to accept first shackles with different arc sizes. A second side of the swivel assembly can be configured to accept second shackles with different arc sizes. Alternatively, the second side of the swivel assembly can be configured to be permanently coupled with a third shackle.

In FIG. 3C, operation 340 forms a swivel shackle assembly. The swivel shackle assembly can include multiple shackles with different arc sizes. The swivel shackle assembly can also include a swivel assembly configured to accept the multiple shackles.

In FIG. 3D, a custom swivel shackle can be formed by selecting appropriate arc size shackles, and then assembling the selected shackles with a swivel assembly. Operation 360 selects a shackle with a desired arc size. Operation 370 couples the shackle with a swivel assembly.

FIGS. 4A-4C illustrate a replaceable swivel shackle according to some embodiments. A replaceable swivel shackle can include a swivel assembly, with at least one replaceable shackle. The swivel assembly can include a first portion rotatably coupled to a second portion, for example, through a swivel shaft. A replaceable shackle can be coupled to the first portion. The second portion can include a permanently mounted shackle, or can have a second replaceable shackle.

FIG. 4A shows a first portion 450 of a swivel assembly. The portion 450 can include a coupling 441 which can accept a swivel shaft, so that the portion 450 can be rotatable around the swivel shaft. The portion 450 can include a coupling interface 451, which can accept a replaceable shackle. The coupling interface 451 can have two sections for accepting two end portions of the shackle.

FIG. 4B shows a cross section AA' of the first portion 450, showing the swivel axis coupling, and the coupling interface for the replaceable shackle.

FIGS. 4C(a)-(c) show a sequence of assembling of a replaceable shackle to the swivel assembly. A swivel assembly 400 can include a first portion 450, which is rotatably coupled to a second portion 420 through a swivel shaft 440. The swivel shaft 440 can form a rotatable axis, e.g., the first portion 450 and the second portion 420 can be rotated around the rotatable axis. The second portion 420 can include a shackle, which can be permanently coupled to the first portion through the swivel shaft. The shackle of the second portion can be a jaw shackle, e.g., having an open jaw, which is connected by a shackle pin 430.

The first portion 450 can include a coupling interface 451, which can be configured to be mated with a coupling 461 of the replaceable shackle 411. The coupling interface 451 can include through openings, e.g., openings passing through the first portion 450, so that the shackle can pass through the first portion. Since the shackle 411 forms a curving U, e.g., the opening ends of the U shape are closer together to form more than half a circle, the extreme ends of the shackle can be smaller than the middle of the shackle. Thus the through opening can have a larger section at a surface facing away from the second portion 420, and a smaller section at a surface facing the second portion 420. That way, the shackle 411 can be mated to the coupling interface 451.

After the shackle is coupled to the coupling interface, nuts 461 can be used to secure the shackle with the first portion. In addition, cotter pins can be used to prevent the nuts from rotating, e.g., to prevent losing the nuts due to vibration.

As shown, the shackle 411 can have a coupling 461 that is mated with the coupling interface 451, having an integrated filler portion to fill the through openings 451. Thus, after coupling the shackle to the first portion at the coupling interface, the shackle can fit well in the through openings, even with the larger top of the opening.

Alternatively, the shackle can be just a curve rod, e.g., a rod bent in the shape of an almost circle. A separate filler can optionally be used to fill the coupling interface, after the shackle has been placed in the through openings, for example, to secure the shackle with the first portion so that the shackle does not move inside the through openings.

In some embodiments, the coupling interface is configured so that the ends of the shackle fit well within the openings in the first portion. A shape of the coupling interface can be so that the shackle can be inserted from a top side, e.g., a side away from the second portion or from the other shackle. If the shackle includes curving outward arcs, e.g., as shown in shackle 411 that the two extreme ends of the shackle is closer together than a middle portion of the shackle, then the through openings in the first portion can include a taper upward portion, e.g., a larger top than a bottom portion. If the shackle includes straight end portions, the through openings can be straight openings.

FIGS. 5A-5B illustrate flow charts for forming a swivel shackle according to some embodiments. In FIG. 5A, operation 500 forms a swivel assembly. The swivel assembly includes a first portion and a second portion. The first portion includes a crosspiece rotatable relative to the second portion. The crosspiece includes through openings for accepting shackles having different arc sizes. The through openings include a larger top portion and a smaller bottom portion to accommodate slanted end portions of the shackles.

Operation 510 forms multiple shackles having different arc sizes. The multiple shackles each includes same slanted end portions configured to fill the through openings in the swivel assembly.

In FIG. 5B, operation 530 selects a shackle with a desired arc size. Operation 540 inserts two ends of the shackle into a swivel assembly, wherein the ends of the shackles fit into openings of the swivel assembly. Operation 550 secures the shackle with the swivel assembly.

In some embodiments, the present invention discloses swivel assemblies that can be used to form swivel shackles with different arc sizes and body designs. The swivel assemblies can have coupling interfaces that can be used to be coupled to replaceable shackles that have couplings that can be mated with the coupling interfaces. The swivel assemblies can have one or two replaceable shackles, e.g., one of the shackles can be permanently attached to the swivel assemblies.

FIGS. 6A-6H illustrate configurations for swivel assemblies according to some embodiments. In FIG. 6A, a swivel assembly 600 can include a first portion 650 rotatably coupled to a second portion 620, which can be a jaw shackle. The jaw shackle 620 can have an open jaw, which can be close with a shackle pin 630. A screw pin is shown, but other pin configurations can be used, such as bolt type pin.

A swivel shaft 640 can be used to couple the first portion 650 with the shackle 620. The swivel shaft 640 can allow a rotation of the first portion 650 with respect to the shackle 620, e.g., around a rotational axis 610 along the swivel shaft 640.

The first portion 650 can include coupling interfaces 680, which can be configured to be mated with shackles having different sizes and/or designs. As shown, the coupling interfaces 680 can include through openings, e.g., passages from a first surface facing away from the shackle 620 to an opposite second surface facing the shackle 620. The coupling interfaces can be configured to accept shackles inserted from the first surface, thus can have a top portion (e.g., the portion at the first surface) larger than the bottom portion (e.g., the portion at the second surface).

Nuts 660 can optionally be coupled to the first portion 650. Nuts 660 can be used for securing the inserted shackles, so the nuts can be configured so that the nuts can be freely rotated in place, e.g., the nuts can be loosely coupled to the first portion. The nuts can be integrated with the first portion, e.g., forming an integral part of the first portion. Alternatively, the nuts can be separate components, which can be brought in after inserting the shackle.

FIG. 6B shows a swivel assembly 601, which is similar, except for the swivel shaft. The first portion 651 can be coupled to the shackle 621 through a swivel ball 641. The swivel ball can allow only a relative rotation of the first portion with respect to the shackle, for example, around the rotational axis 611. The swivel ball can also allow a rotation of the first portion within a solid angle 671, e.g., the first portion can also be tilted to form an angle with the shackle. With the ability to rotate, the shackle thus can be tilted in any orientation with respect to the first portion.

FIG. 6C shows a swivel assembly 602 that can be configured to accept two replaceable shackles. The swivel assembly 602 can include a first portion 652A which can be rotatably coupled with a second portion 652B, through a swivel shaft 642.

The first portion 652A can include coupling interfaces 682A, which can be configured to be mated with shackles having different sizes and/or designs. As shown, the coupling interfaces 682A can include through openings such as through holes, e.g., passages from a first surface facing away from the second portion 652B to an opposite second surface facing the second portion 652B. The coupling interfaces can be configured to accept individual arms of a shackle inserted from the first surface, thus can have a top portion (e.g., the portion at the first surface) about the same size as the bottom portion (e.g., the portion at the second surface). For example, the shackle can have two separate individual arms that can have shackle ears at one end to accept a shackle pin. Since the arms can be separated, for example, by removing the shackle pin, individual arms can be inserted to the through openings in the first portion.

Nuts 662 can be loosely coupled to the first portion 652, e.g., the coupling can keep the nuts at the first portion, and can also allow the nuts to move, such as freely rotate and move a little in three directions.

The second portion 652B can include coupling interfaces 682B, which can be configured to be mated with shackles having different sizes and/or designs. As shown, the coupling interfaces 682B can include through openings such as through holes, e.g., passages from a first surface facing away from the first portion 652A to an opposite second surface facing the first portion 652A. The coupling interfaces can be configured to accept individual arms of a shackle inserted from the first surface, thus can have a top portion (e.g., the portion at the first surface) about the same size as the bottom portion (e.g., the portion at the second surface).

The shackle can have its own secure nuts, so the second portion might not need to have nuts included.

FIG. 6D shows a swivel assembly 603 that can be configured to accept two replaceable shackles. The swivel assembly 603 can include a first portion 653A which can be rotatably coupled with a second portion 653B, through a swivel ball 643. The swivel ball can allow the first portion to rotate relative to the second portion, together with having the first portion forming different angles with the second portion.

The first portion 653A can include coupling interfaces 683A, which can be configured to be mated with shackles having different sizes and/or designs. As shown, the coupling interfaces 683A can include slits, e.g., passages from a first surface facing away from the second portion 653B to an opposite second surface facing the second portion 653B. The slits can allow a jaw shackle to be inserted from the second surface. Since the jaw shackle typically has a larger jaw opening as compared to an opposite end portion of the jaw shackle, the slits can be slanted to accommodate, e.g., having the same shape as the jaw shackle. Since the jaw shackle can be inserted from the second portion side, secure means such as nuts might not be needed.

The second portion 653B can include coupling interfaces 683B, which can be configured to be mated with shackles having different sizes and/or designs. As shown, the coupling interfaces 683B can include through openings such as through holes, e.g., passages from a first surface facing away from the first portion 653A to an opposite second surface facing the first portion 653A. The coupling interfaces can be configured to accept individual arms of a shackle inserted from the first surface, thus can have a top portion (e.g., the portion at the first surface) about the same size as the bottom portion (e.g., the portion at the second surface).

The shackle can be inserted from the first portion, so there can be no need for secure nuts. Instead, recesses or indentation can be included to restrict the movement of the shackle.

FIG. 6E shows a swivel assembly 604 including a first portion 654 rotatably coupled to a second portion 624, which can be a jaw shackle. The jaw shackle 624 can have an open jaw, which can be close with a shackle pin 634. A screw pin is shown, but other pin configurations can be used, such as bolt type pin.

A swivel shaft 644 can be used to couple the first portion 654 with the shackle 624. The swivel shaft 644 can allow a rotation of the first portion 654 with respect to the shackle 624, for example, around a rotational axis 614 along the swivel shaft.

The first portion 654 can include coupling interfaces 684, which can be configured to be mated with shackles having different sizes and/or designs. As shown, the coupling interfaces 684 can include threaded recesses, for example, to accept bolts or shoulder bolts 674. The coupling interfaces can be configured to accept shackles having shackle ears that can be bolted to the first portion at the coupling interface. The shoulder bolts can allow the shackle to be pivotable with respect to an axis 674 along the shoulder bolt. In this way, the swivel shackle can have freedom of movement in two axes, a pivoting axis 674 along the shoulder bolts and a rotational axis 614 along the swivel shaft.

FIG. 6F shows a swivel assembly 605 including a first portion 655 rotatably coupled to a second portion 625, which can be a jaw shackle. The jaw shackle 625 can have an open jaw, which can be close with a shackle pin 635. A screw pin is shown, but other pin configurations can be used, such as bolt type pin.

A swivel ball 645 can be used to couple the first portion 654 with the shackle 624. The swivel ball 645 can allow not only a relative rotation of the first portion with respect to the shackle, but also a limited movement of the first portion within a solid angle, e.g., the first portion can also be tilted to form an angle with the shackle.

The first portion 655 can include coupling interfaces 685, which can be configured to be mated with shackles having different sizes and/or designs. As shown, the coupling interfaces 685 can include threaded recesses, for example, to accept bolts or shoulder bolts. The coupling interfaces can be configured to accept shackles having shackle ears that can be bolted to the first portion at the coupling interface. The shoulder bolts can allow the shackle to be pivotable with respect to an axis along the shoulder bolt. In this way, the swivel shackle can have freedom of movement in two axes, a pivoting axis along the shoulder bolts and a rotational axis along the swivel shaft.

FIG. 6G shows a swivel assembly 606 that can be configured to accept two replaceable shackles. The swivel assembly 606 can include a first portion 656A which can be rotatably coupled with a second portion 656B, through a swivel shaft 646.

The first portion 656 can include coupling interfaces 686, which can be configured to be mated with shackles having different sizes and/or designs. As shown, the coupling interfaces 686 can include threaded recesses, for example, to accept bolts or shoulder bolts. The coupling interfaces can be configured to accept shackles having shackle ears that can be bolted to the first portion at the coupling interface. The coupling interfaces can include a slanted surface, making an angle with the rotational axis of the first portion with respect to the second portion.

A coupling 676 can be used to allow a pivotal rotation of the shackle, forming interfaces 676 that have parallel surfaces with the rotational axis, which can allow the shackle to be pivotable with respect to an axis perpendicular to the coupling 676. Other configurations can be used, such as a rotating mechanism to allow a pivotal rotation of the shackle.

The second portion 656B can include coupling interfaces 686B, which can be configured to be mated with shackles having different sizes and/or designs. As shown, the coupling interfaces 686B can include through openings such as through holes, e.g., passages from a first surface facing away from the first portion 656A to an opposite second surface facing the first portion 656A. The coupling interfaces can be configured to accept individual arms of a shackle inserted from the first surface, thus can have a top portion (e.g., the portion at the first surface) about the same size as the bottom portion (e.g., the portion at the second surface).

The shackle can have its own secure nuts, so the second portion might not need to have nuts included.

FIG. 6H shows a swivel assembly 607 that can be configured to accept two replaceable shackles. The swivel assembly 607 can include a first portion 657A which can be rotatably coupled with a second portion 657B, through a swivel ball 647. The swivel ball can allow the first portion to rotate relative to the second portion, together with having the first portion forming different angles with the second portion.

The first portion 657A can include coupling interfaces 687A, which can be configured to be mated with shackles having different sizes and/or designs. As shown, the coupling interfaces 687A can include threaded recesses, for example, to accept bolts or shoulder bolts. The coupling interfaces can be configured to accept shackles having shackle ears that can be bolted to the first portion at the coupling interface.

A coupling 677 can be used to allow a pivotal rotation of the shackle, forming interfaces 677 that have parallel surfaces with the rotational axis, which can allow the shackle to be pivotable with respect to an axis perpendicular to the coupling 677. The coupling 677 can allow the shackle to be pivotable with respect to an axis perpendicular to the coupling surface. In this way, the swivel shackle can have freedom of movement in two axes, a pivoting axis along the axis perpendicular to the coupling surface and a rotational axis along the swivel shaft.

The second portion 657B can include coupling interfaces 687B, which can be configured to be mated with shackles having different sizes and/or designs. As shown, the coupling interfaces 687B can include slits, e.g., passages from a first surface facing away from the first portion 657A to an opposite second surface facing the first portion 653A. The slits can allow a jaw shackle to be inserted from the second surface. Since the jaw shackle typically has a larger jaw opening as compared to an opposite end portion of the jaw shackle, the slits can be slanted to accommodate, e.g., having the same shape as the jaw shackle. Since the jaw shackle can be inserted from the second portion side, secure means such as nuts might not be needed.

The shackle can be inserted from the first portion, so there can be no need for secure nuts. Instead, recesses or indentation can be included to restrict the movement of the shackle.

FIGS. 7A-7D illustrate flow charts for forming swivel assemblies according to some embodiments. In FIG. 7A, operation 700 forms a swivel assembly, wherein the swivel assembly comprises a first portion and a second portion, wherein the first portion is coupled to the second portion through an axle, wherein the first portion comprises coupling interfaces for accepting shackles having different arc sizes, wherein the first portion comprises bolts for securing the shackles. The coupling interfaces can include through hole openings, through slit openings, or side coupling.

In FIG. 7B, operation 720 forms a swivel assembly, wherein the swivel assembly comprises a first portion and a second portion, wherein the first portion is coupled to the second portion through a ball swivel fitting, wherein the first portion comprises coupling interfaces for accepting shackles having different arc sizes.

In FIG. 7C, operation 740 forms a swivel assembly, wherein the swivel assembly comprises a first portion and a second portion, wherein the first portion is coupled to the second portion through a swivel fitting, wherein the first portion comprises coupling interfaces for accepting first shackles having different arc sizes, wherein the second portion is permanently coupled to a second shackle.

In FIG. 7D, operation 760 forms a swivel assembly, wherein the swivel assembly comprises a first portion and a second portion coupled through a swivel fitting, wherein the first and second portions comprise coupling interfaces for accepting shackles having different arc sizes.

In some embodiments, the shackles can include two separate individual arms. The arms can have one end coupled to a swivel assembly. The other opposite end of the arms can include a shackle ear for securing a shackle pin, such as a screw pin or a bolt type pin.

FIGS. 8A-8C illustrate a configuration for a swivel shackle according to some embodiments. FIG. 8A shows a shackle 810 having two separate individual arms 820 and 821. The arms can have threads at one end, for connecting to a nut for securing to a swivel assembly 800. A shackle ear can be at the opposite end of the arms, for securing two arms by a shackle pin 830. A strap 840 can be optionally included for connecting the two arms.

FIG. 8B(a)-(c) show a sequence of forming a swivel shackle 815. The shackle pin 830 can be removed from the two arms of 820 and 821 the shackle 810. The two arms can face the swivel assemble, e.g., facing the first portion 850 of the swivel assembly 800. The two arms can be inserted to the coupling interfaces 880, which can include straight through openings. For example, the arms can include a straight portion of a rod at the end, which can be mated to the coupling interfaces 880, which include straight through holes. Other configurations of the coupling interfaces can be used, such as curve through openings, for mating with curved arms of the shackle.

After the arms are inserted to the coupling interfaces, nuts 860 can be used to secure the arms to the first portion 850. Then the shackle pin 830 can be used to connect the two arms, forming the swivel shackle 815.

FIG. 8C shows a configuration in which different shackles 810, 811, and 812 with different arc sizes can be coupled to a swivel assembly 800 for form replaceable swivel shackles. The shackles can have a same coupling which can be mated to the coupling interfaces of the swivel assembly, thus swivel shackles with a desired arc sizes can be formed. For example, an arc size can be determined from the job requirement. A shackle meeting the arc size consideration can be selected, and then coupled to the swivel assembly.

As shown, the replaceable swivel shackle can have one replaceable shackle and a permanent shackle. Other configurations can be used, such as a replaceable shackle with two replaceable shackles.

FIGS. 9A-9B illustrate flow charts for forming replaceable shackles according to some embodiments. In FIG. 9A, operation 900 forms a swivel assembly, wherein the swivel assembly comprises a first portion rotatably coupled to a second portion, wherein the first portion comprises straight through openings forming an angle with the rotating axis, wherein the openings are configured for accepting shackles having different arc sizes. Operation 910 forms multiple shackles, wherein the multiple shackles each comprises two separate arms, wherein the arms comprise straight end portions and arc portions, wherein the straight end portions are configured to be coupled to the straight through openings, wherein the arc portions form different arc sizes in different shackles of the multiple shackles.

In FIG. 9B, operation 930 selects a shackle with a desired arc size, wherein the shackle comprises two separate arms, wherein each arm comprises a straight end portion and an arc portion. Operation 940 inserts the straight end portions into a swivel assembly, wherein the ends of the shackles fit into openings of the swivel assembly. Operation 950 secures the arms with the swivel assembly.

In some embodiments, the shackles can include two separate arms with one ends of the arms configured to be secured with the swivel assembly. The arms can be configured to be coupled to a swivel assembly from a bottom side, e.g., a side facing the other shackle. Alternatively, the arms can be configured to be coupled to a swivel assembly from a top side, e.g., a side away from the other shackle.

Figures 10A, 10B:
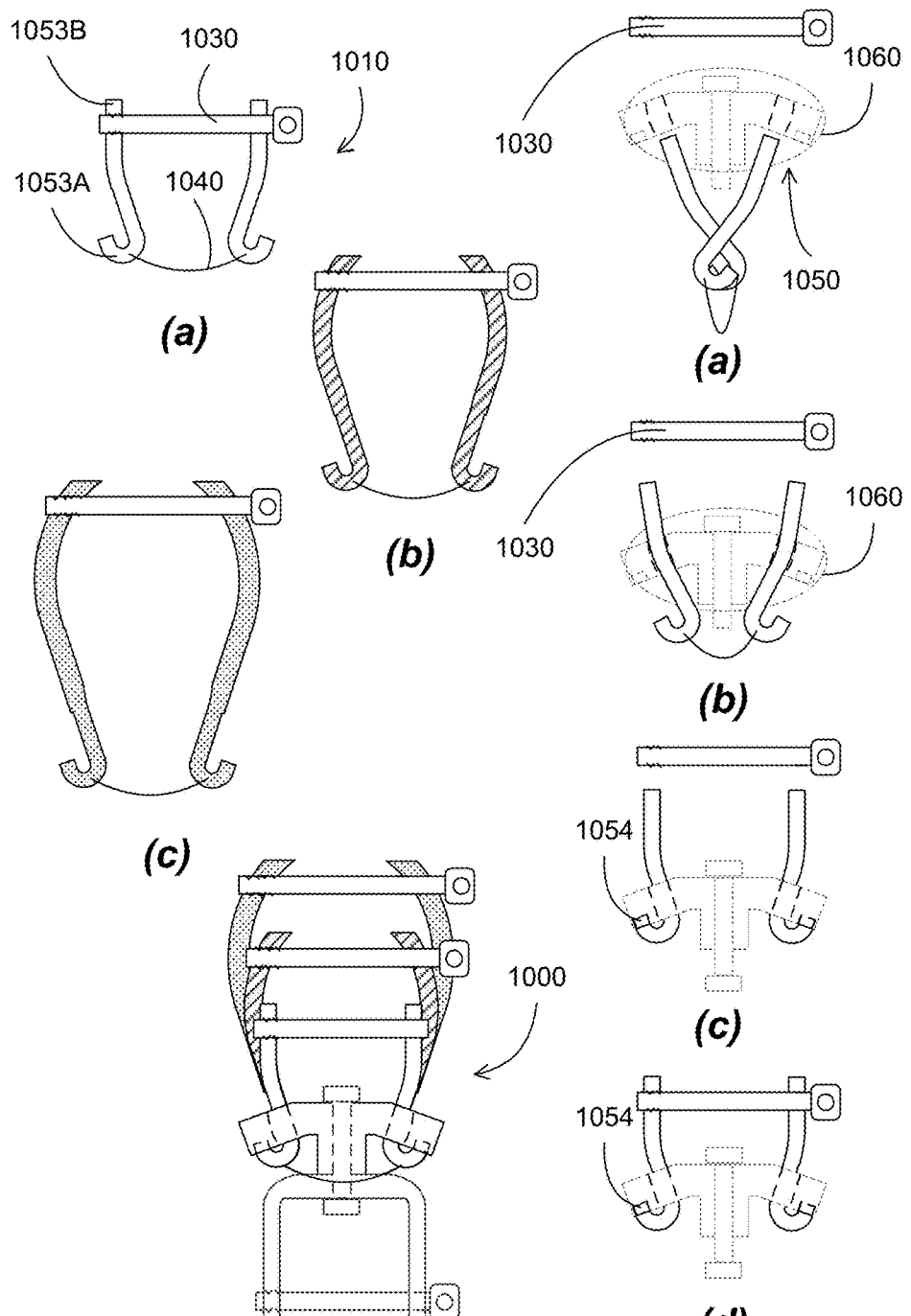
FIGS. 10A-10B illustrate a configuration for a swivel shackle according to some embodiments.

FIGS. 10A-10B illustrate a configuration for a swivel shackle according to some embodiments. FIG. 10A(a)-10A(c) show the shackles having different sizes, but having the same end configurations, e.g., the ends for coupling with the swivel assembly and the ends for securing a shackle pin. In other words, the different size shackles in have arms with different arc sizes, and with similar arc ends.

The shackle 1010 having two separate individual arms. The arms can have hooks at one end 1053A, for connecting to a coupling interface 1060 of the swivel assembly 1000 without any external component. A shackle ear can be at the opposite ends 1053B of the arms, for securing two arms by a shackle pin 1030. A strap 1040 can be optionally included for connecting the two arms.

FIG. 10A(d) shows a configuration in which different shackles with different arc sizes can be coupled to a swivel assembly 1000 for form replaceable swivel shackles. The shackles can have a same coupling which can be mated to the coupling interfaces of the swivel assembly, thus swivel shackles with a desired arc sizes can be formed. For example, an arc size can be determined from the job requirement. A shackle meeting the arc size consideration can be selected, and then coupled to the swivel assembly.

As shown, the replaceable swivel shackle can have one replaceable shackle and a permanent shackle. Other configurations can be used, such as a replaceable shackle with two replaceable shackles.

FIG. 10B(a)-(d) show a sequence of forming a swivel shackle 1015. The shackle pin 1030 can be removed from the two arms of the shackle 1010. The two arms can face a bottom side of the swivel assemble, e.g., facing the bottom portion 1050 of the coupling interfaces 1060 of the swivel assembly 1000. The two arms can be inserted to the coupling interfaces 1060, which can include curved through openings. For example, the arms can include an arc size portion, which can be inserted in to the curved through openings of the coupling interfaces 1060. Other configurations of the coupling interfaces can be used, such as straight through openings, for mating with straight arms of the shackle.

The coupling interfaces can include recesses 1054 to accommodate the end configuration of the arms. After the arms are inserted to the coupling interfaces, the hooks at the ends of the arms can be secured in the recesses. Then the shackle pin 1030 can be used to connect the two arms, forming the swivel shackle.

FIGS. 11A-11B illustrate flow charts for forming replaceable shackles according to some embodiments. In FIG. 11A, operation 1100 forms a swivel assembly, wherein the swivel assembly comprises a first portion rotatably coupled to a second portion, wherein the first portion comprises through openings, wherein the openings are configured for accepting shackles having different arc sizes inserting from a side of the first portion nearest to the second portion. Operation 1110 forms multiple shackles having different arc sizes, wherein the multiple shackles each comprises two separate arms, wherein the arms comprise hooks for securing to the swivel assembly, wherein the arms are configured to be inserted to the through openings from a side facing the second portion.

In FIG. 11B, operation 1130 selects a shackle with a desired arc size, wherein the shackle comprises two separate arms, wherein the arms each comprises a hook for coupling with a swivel assembly from a side facing another shackle. Operation 1140 inserts the arms into the swivel assembly, wherein the hooks prevent the arms from leaving the swivel assembly. Operation 1150 optionally secures the shackle with the swivel assembly the arms with the swivel assembly.

In some embodiments, the shackles can include U shaped shackles, having two arms coupled together at one end. The open ends of the arms can include a shackle ear for securing a shackle pin, such as a screw pin or a bolt type pin. The shackles can be configured to be coupled to a swivel assembly from a bottom side, e.g., a side facing the other shackle.

FIGS. 12A-12C illustrate a configuration for a swivel shackle according to some embodiments. FIG. 12A shows a first portion 1250, e.g., a top portion, of a swivel assembly. The first portion can include a swivel shaft coupling 1240, for coupling with a swivel shaft so that the first portion can rotate around the swivel shaft. The first portion can include coupling interfaces 1251 for coupling with replaceable shackles. The coupling interfaces can include through openings, e.g., through passages from one side of the first portion to an opposite side of the first portion. A first side of the first portion can be a side 1255 facing away from a second portion, and a second side 1256 of the first portion can be a side facing the second portion. The through openings can be larger at the second side, as compared to the openings at the first side, to accommodate the insertion of the shackle from the second side.

FIG. 12B(a)-(c) show a sequence of forming a swivel shackle 1215. The shackle pin 1230 can be removed from the two arms of 1220 and 1221 the shackle 1210. The shackle 1210 can include a mechanism for securing the arms to the swivel assembly, such as through holes 1222 for inserting bolts or cotter pins. The two arms can face the second side of the swivel assemble, e.g., facing the second side of the first portion 1250 of the swivel assembly 1200. The two arms can be inserted to the coupling interfaces 1251. Bolts or cotter pins can be attached, to secure the shackle arms to the swivel assembly. The shackle pin can be re-assembled.

FIG. 12C(a)-(c) shows multiple shackles having different arc sizes. FIG. 12C(d) shows a configuration in which the multiple shackles with different arc sizes can be coupled to a swivel assembly for form replaceable swivel shackles. The shackles can have a same coupling which can be mated to the coupling interfaces of the swivel assembly, thus swivel shackles with a desired arc sizes can be formed. For example, an arc size can be determined from the job requirement. A shackle meeting the arc size consideration can be selected, and then coupled to the swivel assembly.

As shown, the replaceable swivel shackle can have one replaceable shackle and a permanent shackle. Other configurations can be used, such as a replaceable shackle with two replaceable shackles.

FIGS. 13A-13B illustrate flow charts for forming replaceable shackles according to some embodiments. In FIG. 13A, operation 1300 forms a swivel assembly, wherein the swivel assembly comprises a first portion rotatably coupled to a second portion, wherein the first portion comprises through openings, wherein the openings are configured for accepting shackles having different arc sizes inserting from a side of the first portion nearest to the second portion. Operation 1310 forms multiple shackles having different arc sizes, wherein the multiple shackles each comprises same end portions, wherein the end portions are configured to fit the through openings in the swivel assembly, wherein the multiple shackles are configured to be inserted to the through openings from a side facing the second portion.

In FIG. 13B, operation 1330 selects a shackle with a desired arc size, wherein the shackle comprises an end portion configured to fit to a swivel assembly from a side facing another shackle. Operation 1340 inserts the end portions into the swivel assembly, wherein the ends of the shackles fit into openings of the swivel assembly. Operation 1350 optionally secures the shackle with the swivel assembly.

FIGS. 14A-14D illustrate a configuration for a swivel shackle according to some embodiments. FIG. 14A shows a first portion 1450 of a swivel assembly. The first portion can include a swivel shaft coupling 1440, for coupling with a swivel shaft so that the first portion can rotate around the swivel shaft. The first portion can include coupling interfaces 1451 for coupling with replaceable shackles. The coupling interfaces can include slits, e.g., cuts at sides of the first portion, from a first side, e.g., a side facing away from a second portion, to a second side, e.g., a side facing the second portion. The slits can be deeper at the second side, as compared to the first side, to accommodate the insertion of the shackle from the second side.

FIG. 14B shows a mounting of the shackle to form a swivel shackle 1415. The shackle pin can be removed from the shackle. The two arms can face the second side of the swivel assemble, e.g., facing the second side of the first portion of the swivel assembly. The two arms can be inserted to the coupling interfaces. A secure element 1411, such as a cotter pin, can be used to secure the shackle with the first portion. The shackle pin can also be assembled.

FIG. 14C(a)-(c) shows multiple shackles having different arc sizes.

FIG. 14D shows a configuration in which the multiple shackles with different arc sizes can be coupled to a swivel assembly for form replaceable swivel shackles. The shackles can have a same coupling which can be mated to the coupling interfaces of the swivel assembly, thus swivel shackles with a desired arc sizes can be formed. For example, an arc size can be determined from the job requirement. A shackle meeting the arc size consideration can be selected, and then coupled to the swivel assembly.

As shown, the replaceable swivel shackle can have one replaceable shackle and a permanent shackle. Other configurations can be used, such as a replaceable shackle with two replaceable shackles.

Figure 15A:
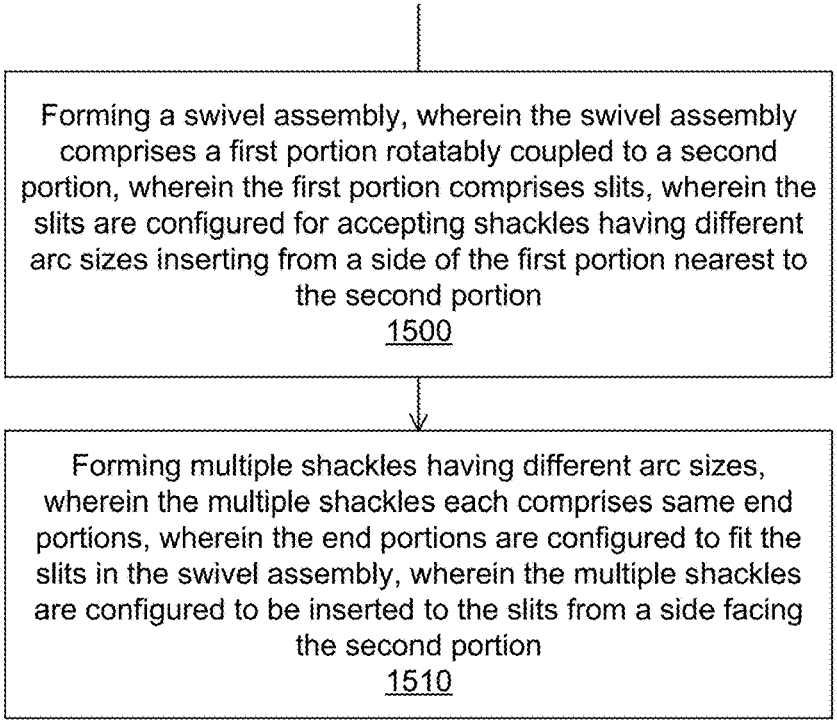
FIGS. 15A-15B illustrate flow charts for forming replaceable shackles according to some embodiments.
Figure 15B:
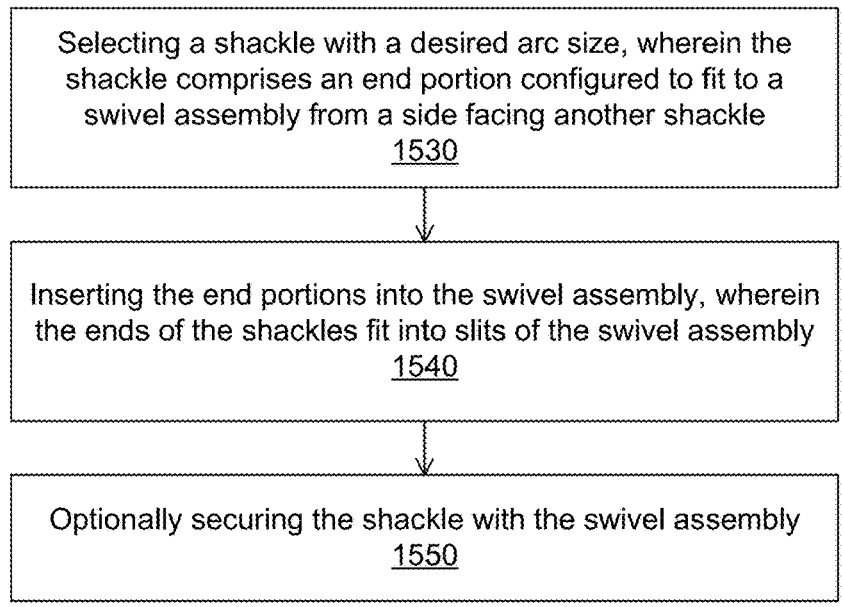

FIGS. 15A-15B illustrate flow charts for forming replaceable shackles according to some embodiments. In FIG. 15A, operation 1500 forms a swivel assembly, wherein the swivel assembly comprises a first portion rotatably coupled to a second portion, wherein the first portion comprises through openings, wherein the openings are configured for accepting shackles having different arc sizes inserting from a side of the first portion nearest to the second portion. Operation 1510 forms multiple shackles having different arc sizes, wherein the multiple shackles each comprises same end portions, wherein the end portions are configured to fit the through openings in the swivel assembly, wherein the multiple shackles are configured to be inserted to the through openings from a side facing the second portion.

In FIG. 15B, operation 1530 selects a shackle with a desired arc size, wherein the shackle comprises an end portion configured to fit to a swivel assembly from a side facing another shackle. Operation 1540 inserts the end portions into the swivel assembly, wherein the ends of the shackles fit into openings of the swivel assembly. Operation 1550 optionally secures the shackle with the swivel assembly.

In some embodiments, the shackles can include U shaped or O shaped shackles, having a curved arm forming an open loop (forming a U shape) or forming a close loop (forming an O shape). The shackles can be configured to be coupled to a swivel assembly from a side, e.g., a side between the side facing the other shackle and the side facing away the other shackle.

FIGS. 16A-16F illustrate a configuration for a swivel shackle according to some embodiments. FIG. 16A shows a perspective view of a coupling interface of a swivel assembly 1650. FIG. 16B shows a top view of the coupling interface of a swivel assembly. FIG. 16C shows a cross section AA' of the coupling interface of a swivel assembly.

The coupling interface 1650 can include a top portion of a swivel assembly. The coupling interface can include a swivel shaft coupling 1640, for coupling with a swivel shaft 1041 so that the coupling interface can rotate around the swivel shaft. The coupling interface can include interfaces 1651 for coupling with replaceable shackles. The interfaces 1651 can include slanted slits, e.g., through passages from one end of the coupling interface to an opposite side of the coupling interface. The slanted slits can be straight, or can be curved, depending on the shapes of the shackles.

FIG. 16D(a)-(b) show a sequence of forming a swivel shackle 1600. A swivel assembly 1601 can include a coupling interface 1650, which is permanently coupled to a shackle 1620. As shown, the shackle 1620 can have a U shape, with a shackle pin 1630 connecting the open ends of the U shape shackle. Other configurations can be used, such as a replacement shackle coupled to the coupling interface 1650. A shackle shaft 1641 can be coupled to the shackle shaft coupling 1641, so that the coupling interface can rotate with respect to the shackle 1620.

A replacement shackle 1610 can be assembled to the coupling interface 1650, by coupling to the slits 1651. The shackle 1610 can include end portions 1611, which can be larger than the openings of the slit 1651, to prevent the shackle from sliding upward, e.g., being removed from the swivel shackle. The shackle 1610 can be pressed to the slits 1651, e.g., the slit dimensions and configuration can be matched with the shackle 1610. As shown, the replaceable swivel shackle can have one replaceable shackle and a permanent shackle. Other configurations can be used, such as a replaceable shackle with two replaceable shackles.

FIG. 16E(a)-(c) shows multiple shackles having different arc sizes. The shackles can have similar ends, e.g., an end configuration that can be used to secure the shackle to the coupling interface, to prevent the shackle from sliding upward when being pull from the swivel shackle.

FIG. 16F shows a different configuration for the shackles with different arc sizes. The shackles can have O shape, e.g., the open ends of the previous shackles can be connected together. The connection can serve to secure the shackles with the coupling interface.

In some embodiments, a seal can be used to secure the shackle with the coupling interface. As described above, a shackle can be coupled to the slits in the coupling interface, to form a shackle of the two shackles of a swivel shackle. The coupling of the shackle with the coupling interface can be further secured by using a seal to close the coupling.

Figure 17A:
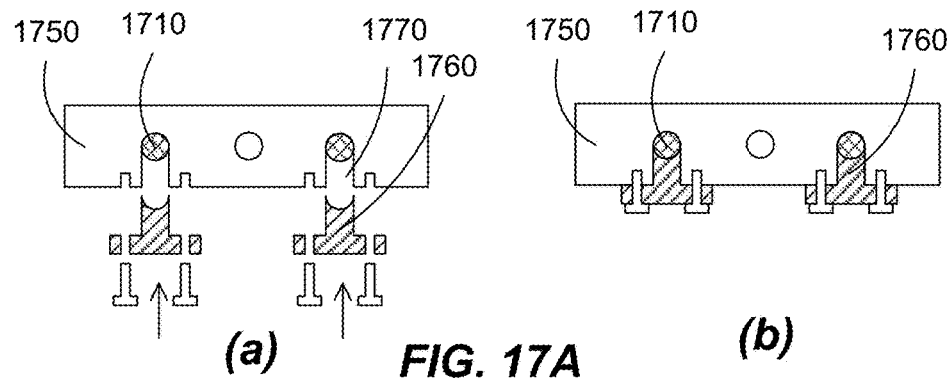
FIGS. 17A-17D illustrate seal configurations for securing the shackle to the coupling interface according to some embodiments.

FIGS. 17A-17D illustrate seal configurations for securing the shackle to the coupling interface according to some embodiments. In FIGS. 17A(a) and 17A(b), a seal 1760 can be used to fill the slits 1770 after the shackle 1710 has been installed into the coupling interface 1750. Screws or bolts can be used to secure the seal into the coupling interface. The seal can be configured to be mated with the shackle and the slits, e.g., the size and shape of the seal can match with the slits and the shackle cross section.

Figure 17B:
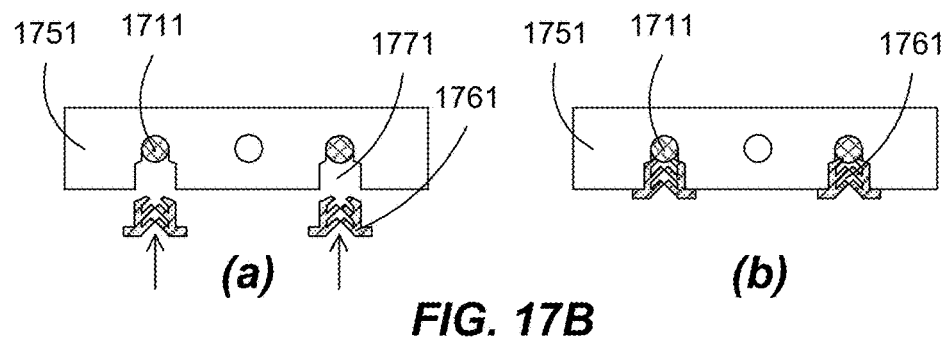

In FIGS. 17B(a) and 17B(b), a seal 1761 can be used to fill the slits 1771 after the shackle 1711 has been installed into the coupling interface 1751. The seal can be configured to be pressed fit into the slits. The seal can have fingers pointing to the shackle to prevent the shackle from leaving the slits.

Figure 17C:
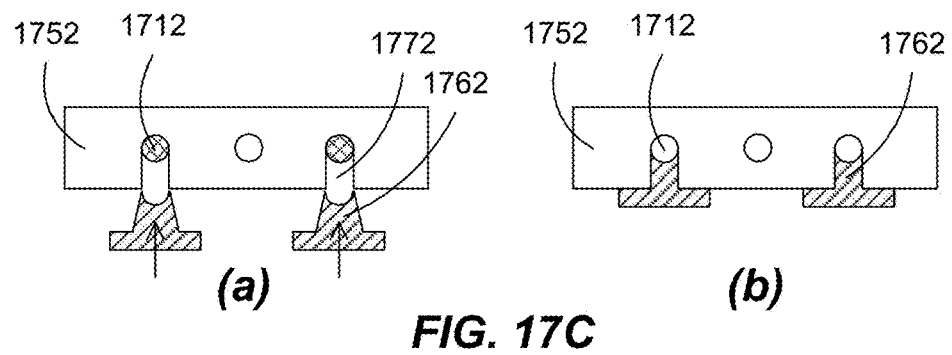

In FIGS. 17C(a) and 17C(b), a seal 1762 can be used to fill the slits 1772 after the shackle 1712 has been installed into the coupling interface 1752. The seal can be configured to be pressed fit into the slits, e.g., the seal can be larger than the opening of the slits, with a tapered cross section to allow the seal to easily engage with the slits.

Figure 17D:
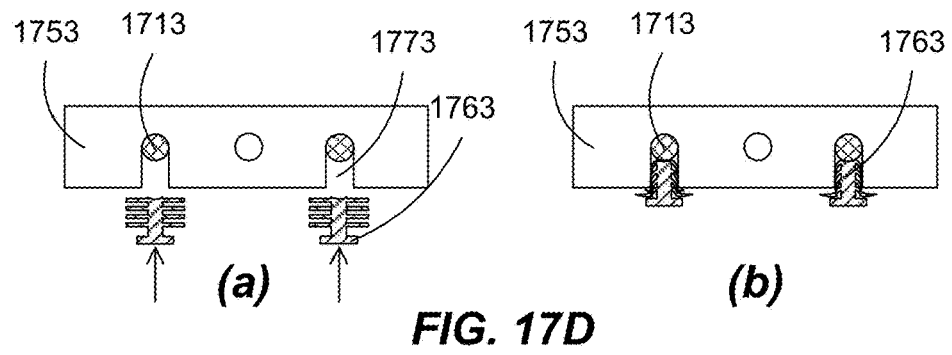

In FIGS. 17D(a) and 17D(b), a seal 1762 can be used to fill the slits 1772 after the shackle 1712 has been installed into the coupling interface 1752. The seal can be configured to be pressed fit into the slits, with fingers pointing outward to secure the seal with the slits.

FIGS. 18A-18B illustrate flow charts for forming replaceable shackles according to some embodiments. In FIG. 18A, operation 1800 forms a swivel assembly, wherein the swivel assembly comprises a first portion rotatably coupled to a second portion, wherein the first portion comprises partial cuts forming an angle with the rotating axis, wherein the partial cuts partially cut the first portion from a side, wherein the partial cuts are configured for accepting shackles having different arc sizes. Operation 1810 forms multiple shackles having different arc sizes, wherein the multiple shackles each comprises same slanted end portions configured to fit the partial cuts in the swivel assembly.

In FIG. 18B, operation 1830 selects a shackle with a desired arc size. Operation 1840 inserts the shackle into a swivel assembly, wherein the shackles fit into cuts of the swivel assembly from a side of the swivel assembly. Operation 1850 optionally secures the shackle with the swivel assembly.

In some embodiments, the shackles can configured to be rotatable at the coupling interface, e.g., rotatable with respect to the coupling interface of the swivel assembly. Thus the shackles can have two axes of rotation. The shackles can be rotatable with respect to the swivel assembly, and the swivel assembly can also be rotatable by an axis perpendicular to the other rotating axis.

Figure 19A:
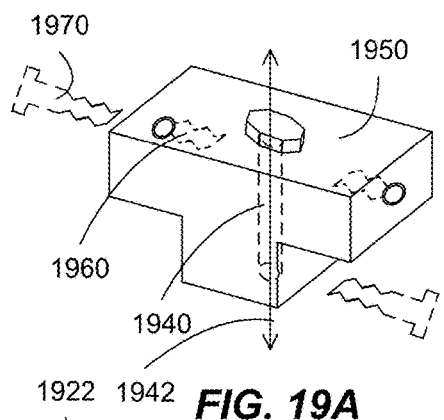
FIGS. 19A-19F illustrate configurations for a swivel shackle according to some embodiments.
Figure 19D:
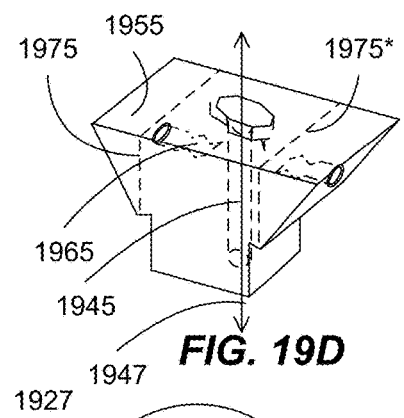
Figure 19B:
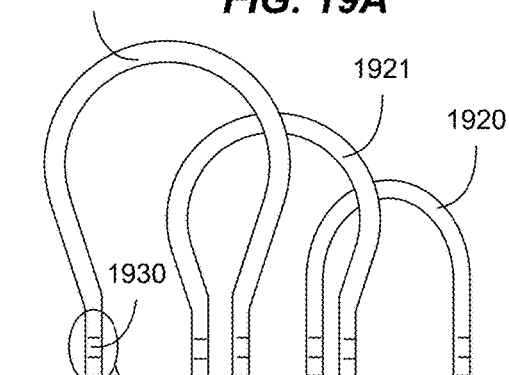

FIGS. 19A-19F illustrate configurations for a swivel shackle according to some embodiments. FIG. 19A shows a perspective view of a coupling interface 1950 of a swivel assembly. The coupling interface 1950 can include a top portion of a swivel assembly. The coupling interface can include a swivel shaft coupling 1940, for coupling with a swivel shaft 1941 so that the coupling interface can rotate around an axis 1942 of the swivel shaft. The coupling interface can include interfaces 1960 for coupling with replaceable shackles. The interfaces 1960 can include tapped holes for accepting bolts, such as shoulder bolts 1970. A shackle can be coupled to the coupling interface by using shoulder bolts, which can rotatably couple the shackle with the coupling interface, FIG. 19B shows shackles 1920, 1921, and 1922 having different arc sizes. The shackles can have U shape, e.g., having open ends. The shackles can have eyelets 1930 at the open ends, which can allow the shoulder bolts 1970 to pass through for securing the shackle with the coupling interface while allowing the shackle to be rotatable around the axis of the shoulder bolts.

Figure 19E:
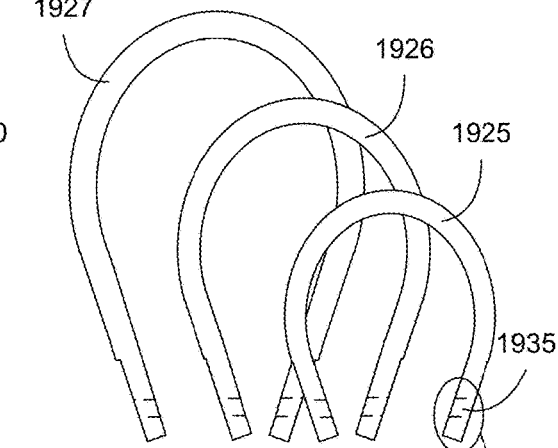
Figure 19C:
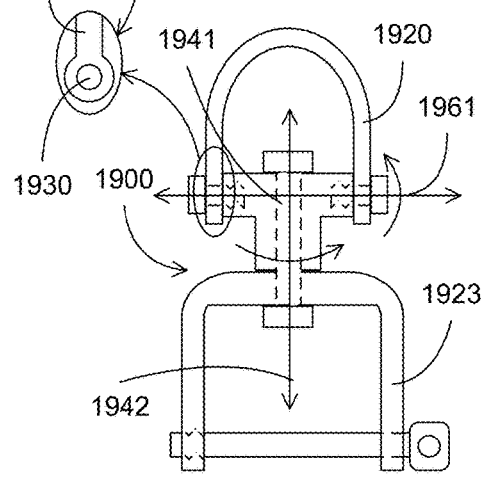

FIG. 19C shows a swivel shackle 1900, including a replacement shackle 1920 rotatably coupled to the swivel assembly. The shackle 1920 can be rotatable around axis 1961 at the coupling between the shackle and the swivel assembly. The swivel assembly can include a permanently coupled shackle 1923, which can be rotatably coupled, e.g., rotatable around axis 1942 of the swivel shaft 1941. Thus the swivel shackle can include two axes of rotation, which can be perpendicular to each other.

FIG. 19D shows a perspective view of a coupling interface 1955 of a swivel assembly. The coupling interface 1955 can include a top portion of a swivel assembly. The coupling interface can include a swivel shaft coupling 1945, for coupling with a swivel shaft so that the coupling interface can rotate around an axis 1947 of the swivel shaft. The coupling interface can include interfaces 1965 for coupling with replaceable shackles. The interfaces 1965 can include tapped holes for accepting bolts. A shackle can be coupled to the coupling interface by using bolts. The coupling interface can include rotatable interface 1975 and 1975*, which can allow the rotation of the shackle. The rotatable interface 1975 and 1975* can include two parallel surfaces, which form parallel rotatable planes (e.g., having a rotatable axis perpendicular to the rotatable planes) for the shackle. As shown, the rotatable interface 1975 and 1975* are parallel, e.g., forming rotatable planes parallel, to the axis of rotation 1947 of the swivel shaft. Other configurations can be used, such as the rotatable interface 1975 and 1975* forming rotatable planes that make an angle different from zero with the rotational axis 1947.

FIG. 19E shows shackles 1925, 1926, and 1927 having different arc sizes. The shackles can have U shape, e.g., having open ends. The shackles can have eyelets 1935 at the open ends, which can allow the bolts 1977 to pass through for securing the shackle with the coupling interface. The shackle can be rotatable along the rotation plane 1975, e.g., to the rotational axis 1966 perpendicular to the rotation plane 1975, thus the shackle can be securely fastened to the coupling interface, for example, there is no need for shoulder bolts, and there is no need for the bolts to be in the axis of rotation 1966.

Figure 19F:
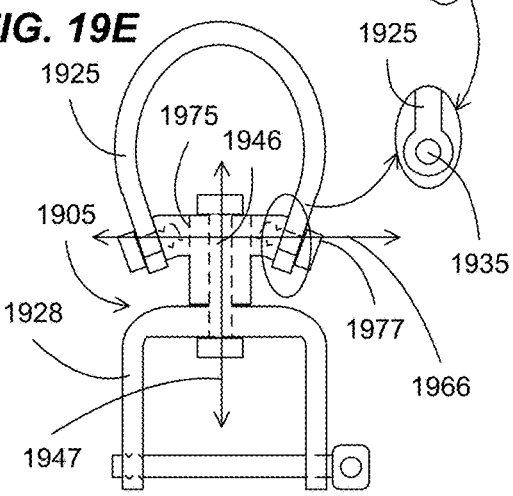

FIG. 19F shows a swivel shackle 1905, including a replacement shackle 1925 rotatably coupled to the swivel assembly. The shackle 1925 can be rotatable around axis 1966 at the coupling between the shackle and the swivel assembly. The swivel assembly can include a permanently coupled shackle 1928, which can be rotatably coupled, e.g., rotatable around axis 1947 of the swivel shaft 1946. Thus the swivel shackle can include two axes of rotation, which, as shown, can be perpendicular to each other. Other configurations can be used, such as the rotational axis 1966 forms an angle different from 90 degrees with the rotational axis 1947.

FIGS. 20A-20B illustrate flow charts for forming replaceable shackles according to some embodiments. In FIG. 20A, operation 2000 forms a swivel assembly, wherein the swivel assembly comprises a first portion rotatably coupled to a second portion, wherein the first portion comprises side coupling for accepting shackles having different arc sizes. Operation 2010 forms multiple shackles having different arc sizes, wherein the multiple shackles each comprises same end portions configured to couple with the side coupling in the swivel assembly.

In FIG. 20B, operation 2030 selects a shackle with a desired arc size. Operation 2040 couples two ends of the shackle into a swivel assembly, wherein the coupling comprises secured or rotatable connections of the shackle with the swivel assembly.

In some embodiments, the replacement shackles can be bents. The bending can allow the open ends of shackles having different arc sizes to be easily coupled with a coupling interface of a swivel assembly. In some embodiments, the bending can be at a small angle, such as 90 degrees or less, including less than 60 degrees, less than 45 degrees, or less than 30 degrees. The small angle bending can provide structural support to the different size shackles, e.g., reinforcing the shackles against tension pulling on the shackles. In addition, reinforced elements can be added to the bends for strengthening the shackles.

Figure 21A:
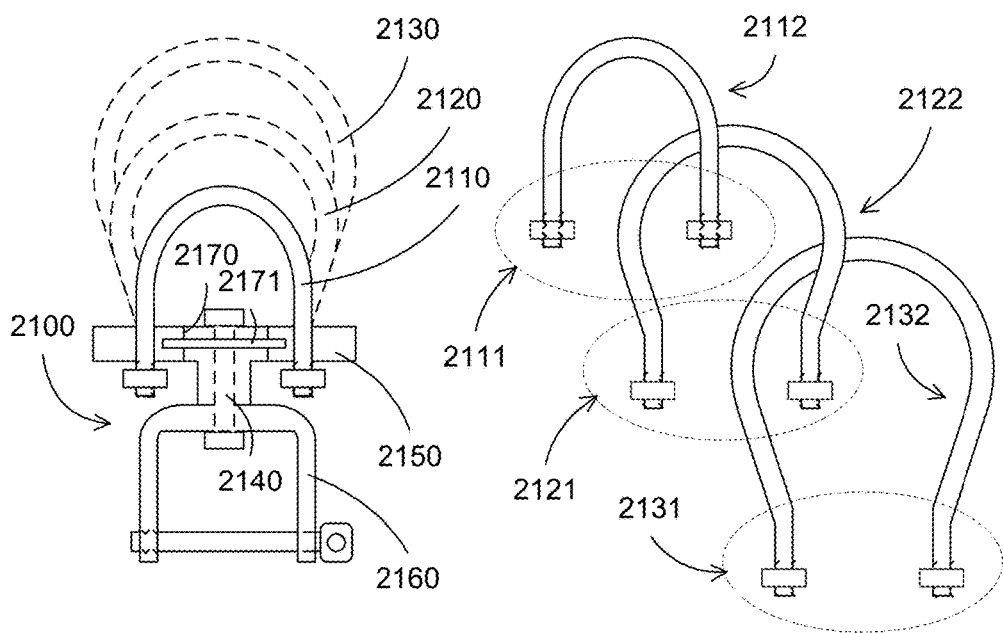
FIGS. 21A-21B illustrate swivel shackle configurations according to some embodiments.
Figure 21B:
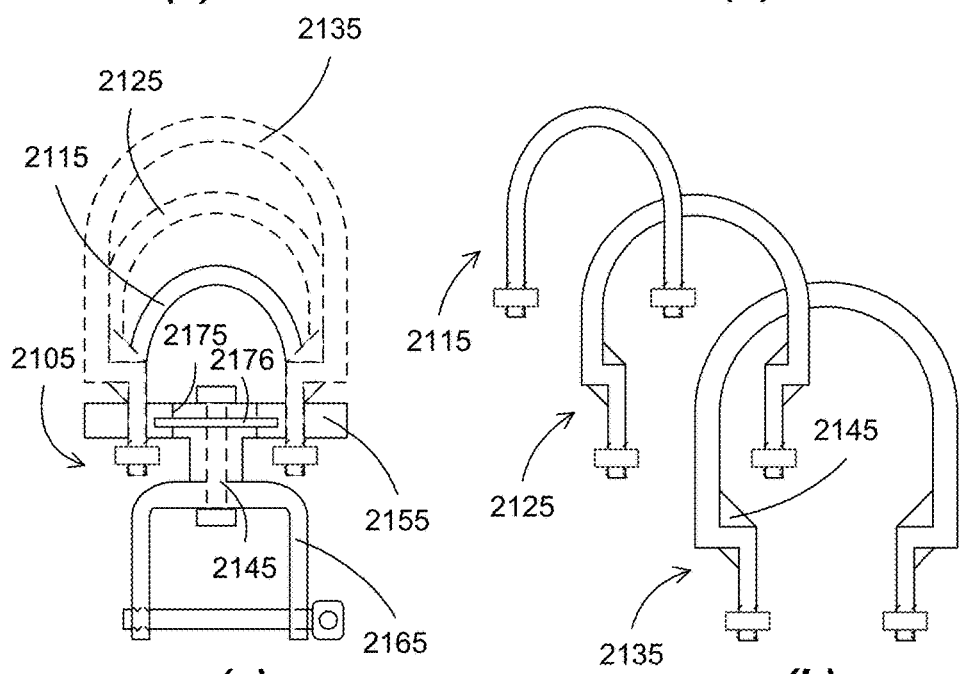

FIGS. 21A-21B illustrate swivel shackle configurations according to some embodiments. FIG. 21A(a) shows a swivel shackle 2100 having a replacement shackle 2110 coupled to a swivel assembly 2150. The swivel assembly 2150 can include a permanently coupled shackle 2160, e.g., the swivel shackle 2100 can include a swivel assembly 2150 coupled to a permanent shackle 2160 and a replacement shackle 2110. Also shown are replacement shackles 2120 and 2130 having different arc sizes. The replacement shackles can have a same coupling interface with different dimensions, e.g., different arc sizes of the U shaped configurations. The replacement shackles 2120 and 2130 can be used to replace the replacement shackle 2110, e.g., the swivel shackle 2100 can include a shackle with a desired arc size, such as small arc size shackle 2110, medium arc size shackle 2120, and large arc size shackle 2130.

FIG. 21A(b) shows the replacement shackles 2110, 2120, and 2130 having different arc sizes, e.g., smaller and larger arcs of the U shaped shackles. Any of the replacement shackles 2110, 2120, and 2130 can be coupled to the swivel assembly 2150. The replacement shackles 2110, 2120, and 2130 can include similar end portions 2111, 2121, and 2131, respectively. The end portions can include two parallel ends, which can allow the insertion of the end portions into the swivel assembly. The end portions can include optional nuts for securing the replacement shackles with the swivel assembly.

The replacement shackles 2110, 2120, and 2130 can include different arc portions 2112, 2122, and 2132, respectively. The replacement shackles with different arc portions can form different size shackles, allowing the swivel shackle to have a desired shackle size.

The swivel assembly 2150 can include a rotating interface 2170, which can allow the shackle 2110, 2120, or 2130 to rotate around an axis along a shaft 2171. The rotating axis can form an angle, such as perpendicular, with the rotational axis along the swivel shaft 2140.

FIG. 21B(a) shows a swivel shackle 2105 with a different configuration for the replacement shackles. The replacement shackles can have right angle bends, with reinforcement to secure the bends.

The swivel shackle 2105 can have a replacement shackle 2115 coupled to a swivel assembly 2155. The swivel assembly 2155 can include a permanently coupled shackle 2165. Also shown are replacement shackles 2125 and 2135 having different arc sizes. The replacement shackles can have a same coupling interface with different dimensions. The replacement shackles 2120 and 2130 can be used to replace the replacement shackle 2110.

FIG. 21B(b) shows the replacement shackles 2110, 2120, and 2130 having different arc sizes, e.g., smaller and larger arcs of the U shaped shackles. The replacement shackles 2110, 2120, and 2130 can include similar end portions, which can include two parallel ends, which can allow the insertion of the end portions into the swivel assembly. The replacement shackles 2110, 2120, and 2130 can include different arc portions to form shackles with different arc sizes.

The swivel assembly 2155 can include a rotating interface 2175, which can allow the shackle 2115, 2125, or 2135 to rotate around an axis along a shaft 2176. The rotating axis can form an angle, such as perpendicular, with the rotational axis along the swivel shaft 2145.

Figure 22:
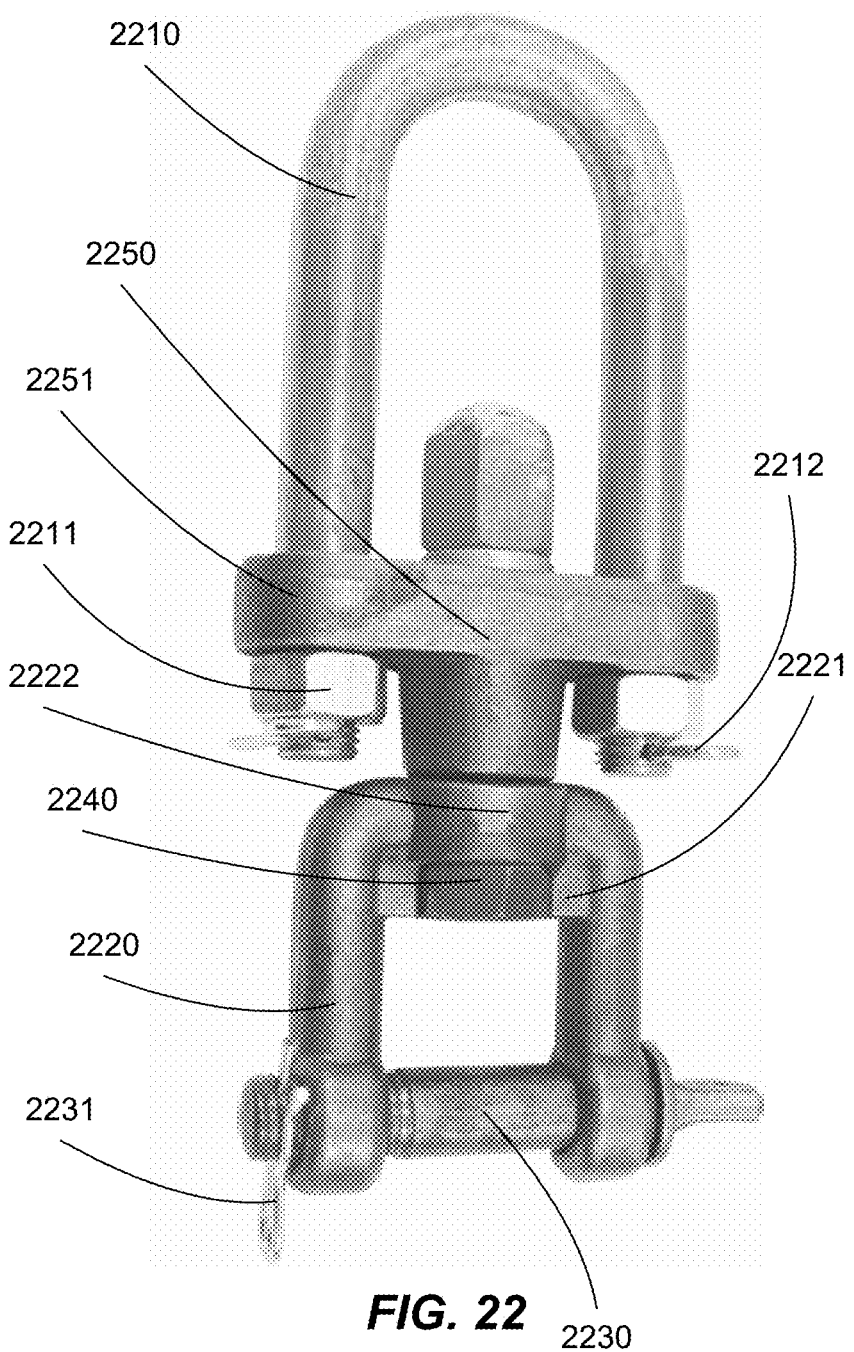
FIG. 22 illustrates a swivel shackle according to some embodiments.

FIG. 22 illustrates a swivel shackle according to some embodiments. The swivel shackle can include a swivel assembly 2250, which is coupled to a permanent shackle 2220. The shackle 2220 can have an opening 2222 for accepting a swivel shaft 2240. Thus the shackle 2220 and the swivel assembly 2250 can rotate around the shackle shaft 2240. The shackle 2220 can have reinforced element 2221 at the U shape bends. The shackle 2220 can have eyelets at end portions for accepting shackle pin 2230. Cotter pin 2231 can be used to secure the shackle pin.

The swivel shackle can include a replacement shackle 2210 coupled to a coupling interface 2151 of the swivel assembly. End portions of the shackle 2210 can pass through openings in the coupling interface 2151. Nuts 2211 can be used to prevent the shackle from being loosen from the coupling interface 2151. Cotter pin 2212 can be used to secure the shackle 2210.

The shackle 2210 can be replaced, e.g., a shackle having larger or smaller arc size with similar end portions can be used to replace the shackle 2210, depending on the requirement of the work to be performed.

Figure 23:
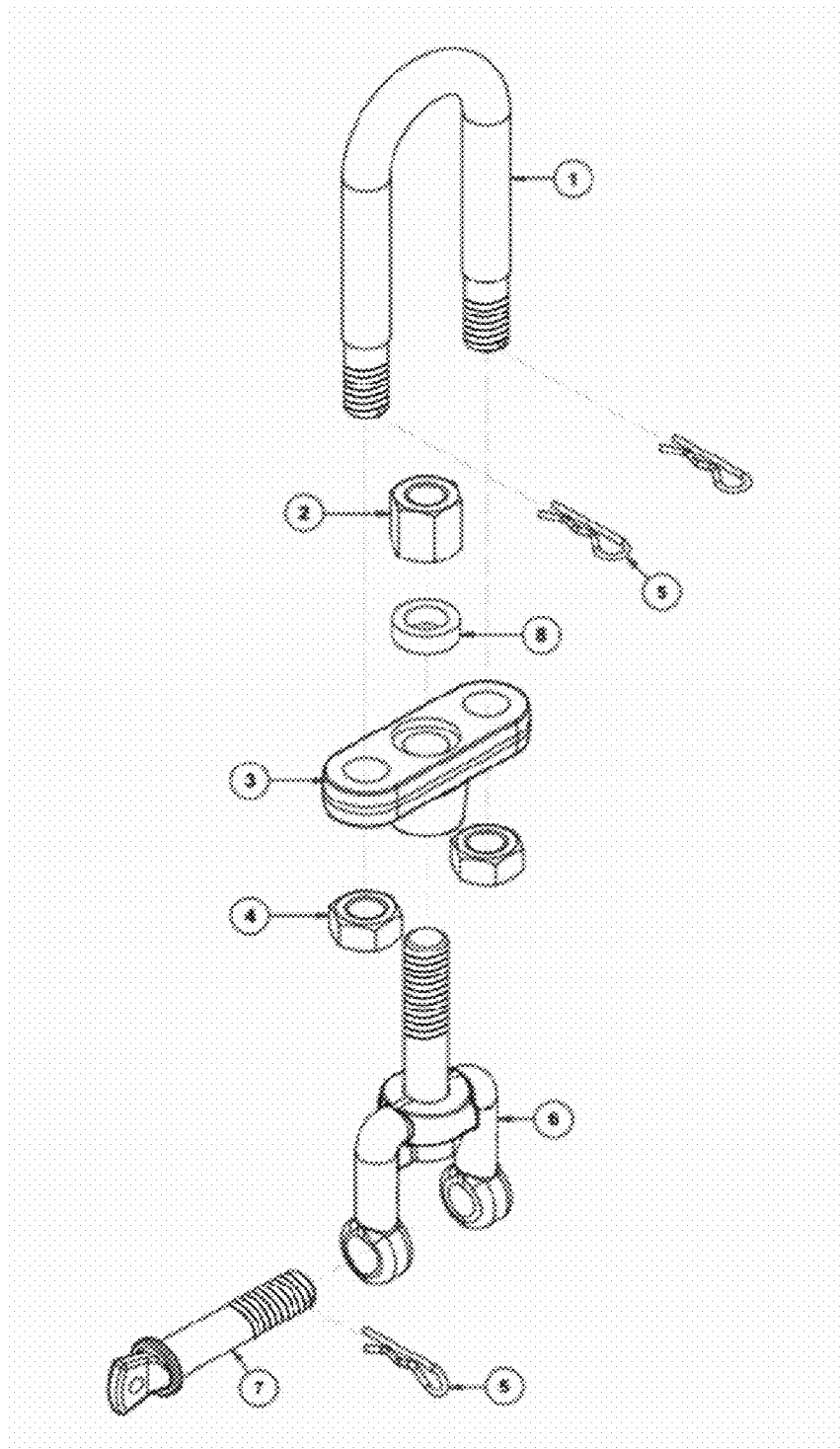
FIG. 23 illustrates an exploded view of a swivel shackle according to some embodiments.

FIG. 23 illustrates an exploded view of a swivel shackle according to some embodiments. Replacement shackle 1 can be coupled to coupling interface 3, using nuts 4 and cotter pins 5. Permanent shackle 6 can be configured to accept shackle pin 7, with cotter pin 5 for securing the shackle pin. The permanent shackle 6 can include a swivel shaft, which can be inserted to an opening in the coupling interface 3, to allow the permanent shackle to rotate around an axis along the swivel shaft. Washer 8 and nut 2 can be used to secure the swivel shaft with the coupling interface.

FIGS. 24A-24B illustrate flow charts for forming swivel shackles according to some embodiments. In FIG. 24A, operation 2400 forms a swivel assembly, wherein the swivel assembly comprises a first portion rotatably coupled to a second portion, wherein the first portion comprises through openings for accepting shackles having different arc sizes. Operation 2410 forms multiple shackles having different arc sizes, wherein the multiple shackles each comprises same straight end portions configured to fit the through openings in the swivel assembly.

In FIG. 24B, operation 2430 selects a shackle with a desired arc size, wherein the shackle comprises a curve arc coupled to two straight end portions. Operation 2440 inserts the two end portions of the shackle into a swivel assembly. Operation 2450 secures the shackle with the swivel assembly.

In some embodiments, the swivel shackle can include two replacement shackles, which are coupled to a swivel assembly. The swivel assembly can rotate around a swivel shaft, e.g., a rotational axis along the swivel shaft. The replacement shackles can have arc sizes selected based on a job requirement, e.g., shackles with different arc sizes can be used with the swivel assembly to form the swivel shackle. The shackles can also be rotatable, such as around an axis making an angle with the rotational axis along the swivel shaft.

FIGS. 25A-25D illustrate swivel shackle configurations with replacement shackles at both sides according to some embodiments. In FIG. 25A, a swivel shackle can include a swivel assembly 2530, which has a top portion 2530A rotatable with respect to a bottom portion 2530B, around a rotational axis 2540 along a swivel shaft. The top portion 2530A can be configured to allow the coupling of replacement shackles having different arc sizes, such as replacement shackle 2510. The replacement shackle 2510 can have a U shape, with a shackle pin at the open end portions for forming a loop. The replacement shackle 2510 can be installed with the close end portion coupled to the top portion at a bottom side or at a front side, as discussed in previous sections. Other replacement shackles discussed in previous sections can also be used.

The bottom portion 2530B can be configured to allow the coupling of other replacement shackles having different arc sizes, such as replacement shackle 2520. The replacement shackle 2510 can have a U shape forming a loop. The replacement shackle 2520 can be installed with the open end portion coupled to the bottom portion at an exposed side, e.g., a side facing away from the other replacement shackle 2510. Nuts can be used to secure the open end of the replacement shackle 2520 to the bottom portion. Other replacement shackles discussed in previous sections can also be used.

In FIG. 25B, a swivel shackle can include a swivel assembly 2531, which has a top portion 2531A rotatable with respect to a bottom portion 2531B, around a rotational axis 2541 along a swivel shaft. The top portion 2531A can be configured to allow the coupling of replacement shackles having different arc sizes, such as replacement shackle 2511. The replacement shackle 2511 can have a U shape, with a shackle pin at the open end portions for forming a loop. The replacement shackle 2511 can be installed with the close end portion coupled to the top portion at a bottom side or at a front side. The top portion 2531A can have a coupling 2571, which can allow the shackle 2511 to be rotated around axis 1561, which forms an angle (such as 90 degree angle) to the other rotational axis 1541. Other replacement shackles discussed in previous sections can also be used.

The bottom portion 2531B can be configured to allow the coupling of other replacement shackles having different arc sizes, such as replacement shackle 2521. The replacement shackle 2511 can have two separate arms. One ends of the arms can be coupled to the bottom portion at an exposed side, e.g., a side facing away from the other replacement shackle 2511. Nuts can be used to secure the open end of the replacement shackle 2521 to the bottom portion. Other ends of the arms can be configured to accept a shackle pin. Other replacement shackles discussed in previous sections can also be used.

In FIG. 25C, a swivel shackle can include a swivel assembly 2532, which has a top portion 2532A coupled to a bottom portion 2532B through a swivel ball 2552. Thus the bottom portion can rotate around a rotational axis 2542 through the center of the swivel ball, together with tilting 2582 at a solid angle from the rotational axis 2542. The top portion 2532A can be configured to allow the coupling of replacement shackles having different arc sizes, such as replacement shackle 2512. The replacement shackle 2512 can have a U shape forming a loop. The replacement shackle 2512 can be installed with the open end portion coupled to the bottom portion at an exposed side, e.g., a side facing away from the other replacement shackle 2522. Nuts can be used to secure the open end of the replacement shackle 2512 to the bottom portion. The top portion 2532A can have a coupling 2572, which can allow the shackle 2512 to be rotated around axis 2562, which forms an angle (such as 90 degree angle) to the other rotational axis 2542. Other replacement shackles discussed in previous sections can also be used.

The bottom portion 2532B can be configured to allow the coupling of other replacement shackles having different arc sizes, such as replacement shackle 2522. The replacement shackle 2522 can have a U shape, with a shackle pin at the open end portions for forming a loop. The replacement shackle 2522 can be installed with the close end portion coupled to the bottom portion at a bottom side or at a front side, as discussed in previous sections. The bottom portion 2532B can have a coupling 2572*, which can allow the shackle 2522 to be rotated around axis 2562*, which forms an angle (such as 90 degree angle) to the other rotational axis 2542. Other replacement shackles discussed in previous sections can also be used.

In FIG. 25D, a swivel shackle can include a swivel assembly 2533, which has a top portion coupled to a bottom portion through a swivel ball. Thus the bottom portion can rotate around a rotational axis through the center of the swivel ball, together with tilting at a solid angle from the rotational axis. The top portion can be configured to allow the coupling of replacement shackles having different arc sizes, such as replacement shackle 2513. The replacement shackle 2513 can have a U shape forming a loop. The replacement shackle 2513 can be installed with the open end portion coupled to the bottom portion at an exposed side, e.g., a side facing away from the other replacement shackle 2523. Nuts can be used to secure the open end of the replacement shackle 2513 to the bottom portion. The top portion can optionally have a coupling, which can allow the shackle 2512 to be rotated around an axis, which forms an angle (such as 90 degree angle) to the other rotational axis. Other replacement shackles discussed in previous sections can also be used.

The bottom portion can be configured to allow the coupling of other replacement shackles having different arc sizes, such as replacement shackle 2523. The replacement shackle 2523 can have two separate arms, with a shackle pin at one ends of the arms for forming a loop. The two separate arms can have a strap for binding the arms together. The replacement shackle 2523 can be installed with the other ends coupled to the bottom portion at a bottom side. Nuts can be used to secure the open end of the replacement shackle 2523 to the bottom portion. The bottom portion can optionally have a coupling, which can allow the shackle 2523 to be rotated around an axis, which forms an angle (such as 90 degree angle) to the other rotational axis. Other replacement shackles discussed in previous sections can also be used.

Figure 26:
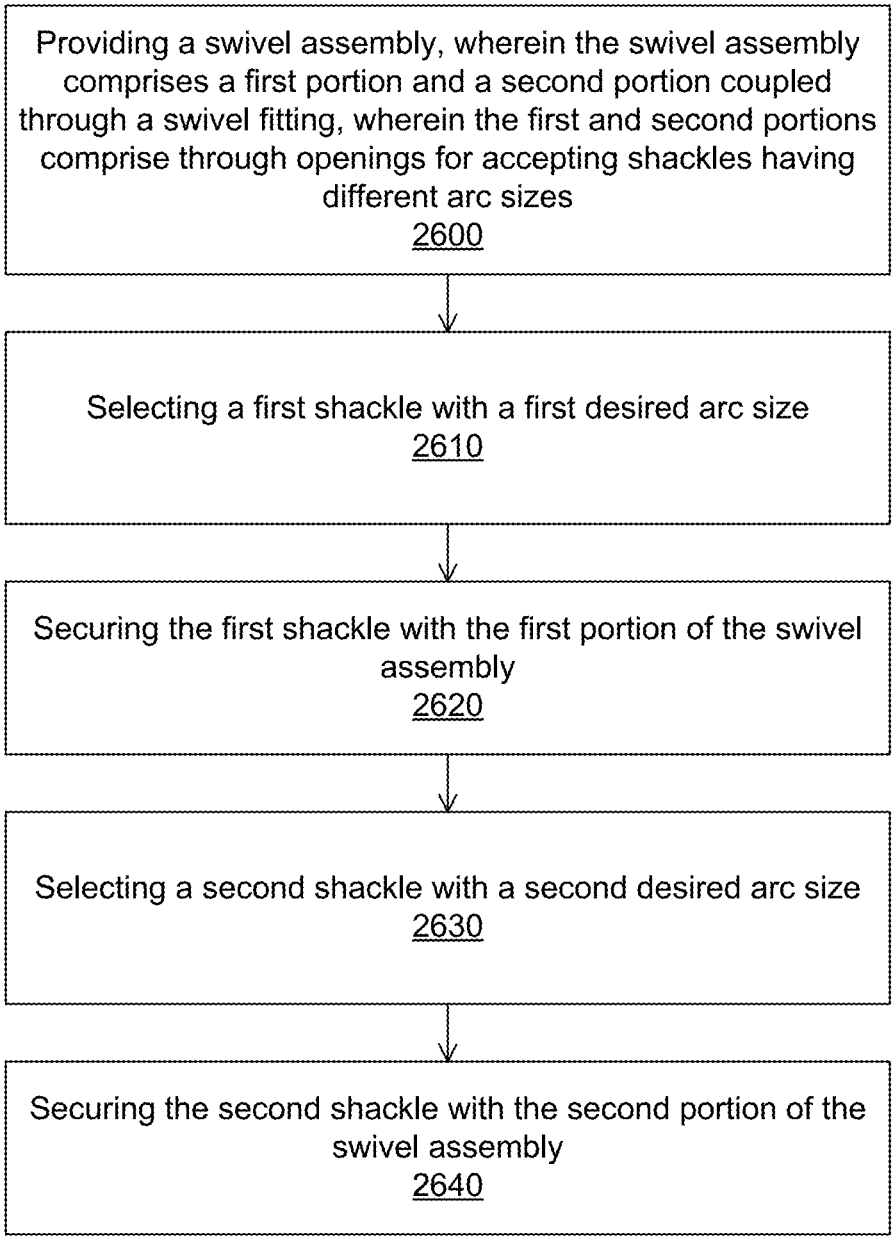
FIG. 26 illustrates a flow chart for a swivel shackle according to some embodiments.

FIG. 26 illustrates a flow chart for a swivel shackle according to some embodiments. Operation 2600 provides a swivel assembly, wherein the swivel assembly comprises a first portion and a second portion coupled through a swivel fitting, wherein the first and second portions comprise through openings for accepting shackles having different arc sizes. Operation 2610 selects a first shackle with a first desired arc size. Operation 2620 secures the first shackle with the first portion of the swivel assembly. Operation 2630 selects a second shackle with a second desired arc size. Operation 2640 secures the second shackle with the second portion of the swivel assembly.

What is claimed is:

1. A swivel shackle comprising
a first portion;
a second portion, wherein the second portion is rotatably coupled to the first portion, wherein the second portion comprises a coupling interface for attaching replaceable shackles having different arc sizes;
a shackle element, wherein the shackle element comprises a desired arc size, wherein the shackle element is coupled to the second portion at the coupling interface,
wherein the second portion is coupled to the first portion through a ball swivel.

2. A swivel shackle as in claim 1
wherein the desired arc size is selected based on a current usage of the swivel shackle.

3. A swivel shackle as in claim 1
wherein the shackle element is pivotally mounted to the coupling interface for the shackle element to be rotatable relative to the second portion.

4. A swivel shackle as in claim 1
wherein the second portion is further pivotally coupled to the first portion for the shackle element to form different angles with the first portion.

5. A swivel shackle as in claim 1
wherein the first portion comprises a second coupling interface for attaching replaceable shackles having different arc sizes,
wherein the swivel shackle further comprises a second shackle element, wherein the second shackle element comprises a desired arc size, wherein the second shackle element is coupled to the first portion at the second coupling interface.

6. A swivel shackle comprising:
a first portion;
a second portion, wherein the second portion is rotatably coupled to the first portion, wherein the second portion comprises a coupling interface for attaching replaceable shackles having different arc sizes;
a shackle element, wherein the shackle element comprises a desired arc size, wherein the shackle element is coupled to the second portion at the coupling interface,
wherein the coupling interface comprises through openings, wherein the through openings comprise a larger top section facing away from the first portion, and a smaller bottom section facing the first portion, wherein the through openings are configured for accepting a replaceable shackle inserting from the larger section,
wherein the shackle element comprises a curve bail having end portions configured to be mated with the through openings.

7. A swivel shackle as in claim 6
wherein the shackle element is pivotally mounted to the coupling interface for the shackle element to be rotatable relative to the second portion.

8. A swivel shackle as in claim 6
wherein the second portion is further pivotally coupled to the first portion for the shackle element to form different angles with the first portion.

9. A swivel shackle as in claim 6
wherein the first portion comprises a second coupling interface for attaching replaceable shackles having different arc sizes,
wherein the swivel shackle further comprises a second shackle element, wherein the second shackle element comprises a desired arc size, wherein the second shackle element is coupled to the first portion at the second coupling interface.

10. A swivel shackle as in claim 6
wherein the second portion is coupled to the first portion through a shaft swivel.

11. A swivel shackle as in claim 1
wherein the coupling interface comprises through openings, wherein the through openings are configured for accepting a replaceable shackle inserting from a section facing away from the first portion,
wherein the shackle element comprises two separate curve arms, wherein the two separate curve arms are linked by a pin, wherein end sections of the two separate curve arms are configured to be mated with the through openings.

12. A swivel shackle as in claim 1
wherein the coupling interface comprises through openings or slits, wherein the through openings or slits comprise a larger bottom section facing away from the first portion, and a smaller top section facing the first portion, wherein the through openings are configured for accepting a replaceable shackle inserting from the larger section,
wherein the shackle element comprises a curve bail, wherein the curve bail comprises first two open end sections linked by a pin, wherein the curve bail comprises a second end section configured to be mated with the through openings or slits.

13. A swivel shackle as in claim 1
wherein the coupling interface comprises through openings, wherein the through openings are configured for accepting a replaceable shackle inserting from a section facing the first portion,
wherein the shackle element comprises two separate curve arms, wherein the two separate curve arms are linked by a pin, wherein end sections of the two separate curve arms are configured to be mated with the through openings,
wherein end sections of the two separate curve arms comprise elements for one-way securing the curve arms to the coupling interface.

14. A swivel shackle as in claim 1
wherein the coupling interface are configured for accepting a replaceable shackle rotatably secured from a side section of the second portion,
wherein the side section is between a section facing the first portion and a section facing away from the first portion,
wherein the coupling interface is configured for the replaceable shackle to be pivotally mounted to be rotatable relative to the second portion.

15. A swivel shackle comprising:
a first portion;
a second portion, wherein the second portion is rotatably coupled to the first portion, wherein the second portion comprises a coupling interface for attaching replaceable shackles having different arc sizes;
a shackle element, wherein the shackle element comprises a desired arc size, wherein the shackle element is coupled to the second portion at the coupling interface,
wherein the coupling interface comprises slits, wherein the slits are configured for accepting a replaceable shackle inserting from a side section of the second portion, wherein the side section is between a section facing the first portion and a section facing away from the first portion,
wherein the shackle element comprises a curve bail having end portions configured to be mated with the slits,
wherein the swivel shackle further comprises plugs for securing the shackle element with the coupling interface.

16. A swivel shackle as in claim 15
wherein the shackle element is pivotally mounted to the coupling interface for the shackle element to be rotatable relative to the second portion.

17. A swivel shackle as in claim 15
wherein the second portion is further pivotally coupled to the first portion for the shackle element to form different angles with the first portion.

18. A swivel shackle as in claim 15
wherein the first portion comprises a second coupling interface for attaching replaceable shackles having different arc sizes,
wherein the swivel shackle further comprises a second shackle element, wherein the second shackle element comprises a desired arc size, wherein the second shackle element is coupled to the first portion at the second coupling interface.

19. A swivel shackle as in claim 15
wherein the second portion is coupled to the first portion through a shaft swivel.

20. A swivel shackle as in claim 15 wherein the desired arc size is selected based on a current usage of the swivel shackle.

\* \* \* \* \*